(12) United States Patent
Cole et al.

(10) Patent No.: US 11,350,080 B2
(45) Date of Patent: May 31, 2022

(54) METHODS AND APPARATUS FOR DISPLAYING IMAGES

(71) Applicant: Nevermind Capital LLC, Wilmington, DE (US)

(72) Inventors: David Cole, Laguna Beach, CA (US); Alan McKay Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 16/917,394

(22) Filed: Jun. 30, 2020

(65) Prior Publication Data

US 2020/0404250 A1 Dec. 24, 2020

Related U.S. Application Data

(63) Continuation of application No. 15/861,670, filed on Jan. 4, 2018, now Pat. No. 10,742,964.

(60) Provisional application No. 62/481,457, filed on Apr. 4, 2017.

(51) Int. Cl.
| | |
|---|---|
| *G09G 5/00* | (2006.01) |
| *H04N 13/332* | (2018.01) |
| *G06F 1/16* | (2006.01) |
| *H04N 13/344* | (2018.01) |
| *G02B 27/01* | (2006.01) |
| *G06F 3/01* | (2006.01) |

(52) U.S. Cl.
CPC ....... *H04N 13/332* (2018.05); *G02B 27/0172* (2013.01); *G06F 1/163* (2013.01); *G06F 3/011* (2013.01); *H04N 13/344* (2018.05); *G02B 2027/0134* (2013.01)

(58) Field of Classification Search
CPC .. H04N 13/322; H04N 13/324; H04N 13/332; H04N 13/344; G02B 27/0172; G02B 2027/0134; G06F 1/163; G06F 3/011
See application file for complete search history.

(56) References Cited

U.S. PATENT DOCUMENTS

| | | | |
|---|---|---|---|
| 6,545,650 B1* | 4/2003 | Yamada | H04N 13/398 345/7 |
| 2009/0268287 A1* | 10/2009 | Buchon | G02B 27/0176 359/480 |
| 2011/0254918 A1* | 10/2011 | Chou | H04N 13/264 348/43 |

(Continued)

*Primary Examiner* — Joe H Cheng
(74) *Attorney, Agent, or Firm* — Blank Rome LLP

(57) ABSTRACT

Methods and apparatus for using a display in a manner which results in a user perceiving a higher resolution than would be perceived if a user viewed the display from a head on position are described. In some embodiments one or more displays are mounted at an angle, e.g., sometimes in range a range from an angle above 0 degrees to 45 relative to a user's face and thus eyes. The user sees more pixels, e.g., dots corresponding to light emitting elements, per square inch of eye area than the user would see if the user were viewing the display head on due to the angle at which the display or displays are mounted. The methods and display mounting arrangement are well suited for use in head mounted displays, e.g., Virtual Reality (VR) displays for stereoscopic viewing (e.g., 3D) and/or non-stereoscopic viewing of displayed images.

12 Claims, 24 Drawing Sheets

(56) References Cited

U.S. PATENT DOCUMENTS

| | | | | |
|---|---|---|---|---|
| 2012/0050279 A1* | 3/2012 | Nishibe | ............... | H04N 13/139 |
| | | | | 345/419 |
| 2012/0154698 A1* | 6/2012 | Matsuhiro | ............... | G02B 30/24 |
| | | | | 349/15 |
| 2012/0287252 A1* | 11/2012 | Tsuchida | ............... | G09G 3/3677 |
| | | | | 348/56 |
| 2012/0320100 A1* | 12/2012 | Machida | ............... | G02B 27/017 |
| | | | | 345/690 |
| 2013/0113973 A1* | 5/2013 | Miao | ................... | G09G 3/003 |
| | | | | 348/333.01 |
| 2013/0169633 A1* | 7/2013 | Hattori | ................. | G06T 15/005 |
| | | | | 345/419 |
| 2015/0009236 A1* | 1/2015 | Saito | ..................... | G01S 5/163 |
| | | | | 345/656 |
| 2016/0103326 A1* | 4/2016 | Kimura | ................... | G09G 5/10 |
| | | | | 345/690 |
| 2016/0373734 A1* | 12/2016 | Cole | ..................... | H04N 17/002 |
| 2018/0027152 A1* | 1/2018 | Sheridan | ............. | H04N 5/2254 |
| | | | | 348/47 |
| 2018/0359463 A1* | 12/2018 | Mori | ................... | H04N 13/344 |
| 2018/0364488 A1* | 12/2018 | Mori | ................... | G02B 27/022 |

\* cited by examiner

| FIGURE 21A | FIGURE 21B |

METHODS AND APPARATUS FOR DISPLAYING IMAGES

RELATED APPLICATIONS

The present application is a continuation of U.S. patent application Ser. No. 15/861,670 filed Jan. 4, 2018, now U.S. Pat. No. 10,742,964, which claims the benefit of U.S. Provisional Patent Application Ser. No. 62/481,457 filed Apr. 4, 2017, both of which are hereby incorporated by reference in their entirety.

FIELD

The present invention relates to methods and apparatus for display images, and more particularly, to methods and apparatus related to increased perceived pixel density.

BACKGROUND

The size of an individual pixel, e.g., pixel element, on a display is subject to physical limitations of the display. As a result, the resolution that can be presented to a user in dots per inch of a display screen is limited physically.

Normally display screens are viewed by a user with the user looking directly at the display screen. Thus, most systems which use a flat screen are designed to be viewed with a user's head perpendicular to the display screen. In such a case a line extending from the user's eyes to the display screen would be at 90 degrees to the display screen. With LCD and/or LED displays, the perceived image quality normally degrades somewhat as the angle at which a screen is viewed deviates from a straight on view of the screen. However, the range of viewing angles which produce what are often considered acceptable has increased so that with many newer displays a range of viewing angles can be supported. Thus a person to the side of a large screen TV may still have a satisfactory viewing experience in many cases.

While improvements in display screens have increased, the range of viewing angles which provide acceptable viewing results, the dot pitch of screens, and thus the minimum size of pixels on a display, remains a constraint on the quality a user will perceive. In the case of small screens which are placed near a user's eye, e.g., as part of a virtual reality (VR) headset, the physical limitations on dot pitch can limit the resolution of an image when the screen is viewed head on which is normally the case.

In view of the above discussion, it should be appreciated that there is a need for methods and/or apparatus which allow for improved viewing experiences.

SUMMARY

In various embodiments one or more display screens are mounted at an angle or angles relative to a user's intended viewing position so that when viewed, a user will intentionally see the display at a non-perpendicular angle to the user's eye or eyes. From the perspective of the viewer, for a given horizontal distance left to right observed by the user's eye, the user will observe more pixel elements of the display than the user would observe if the user were viewing the angle dead on, e.g., at a 90 degree viewing angle. This results in an increased perceived pixel density as compared to what would be observed if the screen were viewed dead on. Thus, by controlling the mounting and viewing arrangement, a user can perceive the screen as having a higher pixel density and resolution than would be perceived if the screen were viewed head on. This results in what can be called a perceived screen resolution which is higher than the actual display resolution.

The methods and apparatus of the present invention are particularly well suited for use in a head mounted display device but are not limited to such applications. In the case of a head mounted display, the depth of the display is often not critical and thus the increased depth required to allow for mounting a display at an angle is not a significant factor in device acceptability.

An exemplary system, in accordance with various embodiments, includes a headmount assembly; and a first display included in the headmount assembly and mounted at an angle relative of a user's eye position. An exemplary system, in accordance with some embodiments, includes a display housing; and a first display mounted in said display housing at an angle relative to a viewing surface through which the first display can be viewed. An exemplary method of processing and displaying images on a display, in accordance with various embodiments, includes: receiving a left eye image; receiving a right eye image; transforming the left eye image as a function of a left eye image display area display arranged at an angle relative to a user's left eye to generate a transformed left eye image, said transforming including scaling the left eye image as a function of the left eye image display area; transforming the right eye image as a function of a right eye image display area arranged at an angle relative to the user's right eye to generate a transformed right eye image, said transforming the right eye image including scaling the right eye image as a function of a right eye image display area; and displaying the transformed left eye image on the left eye image display area and displaying the transformed right eye image on the right eye image display area.

While various features and methods have been described all embodiments need not include all features or steps mentioned in the summary. Numerous additional features and embodiments are discussed in the detailed description which follows.

BRIEF DESCRIPTION OF THE FIGURES

FIG. 4 shows a head mount with displays that are mounted in a normal manner so that they will be viewed by a user's eyes straight on.

FIG. 20 comprises the combination of FIG. 20A and FIG. 20B.

DETAILED DESCRIPTION

Figure 1:
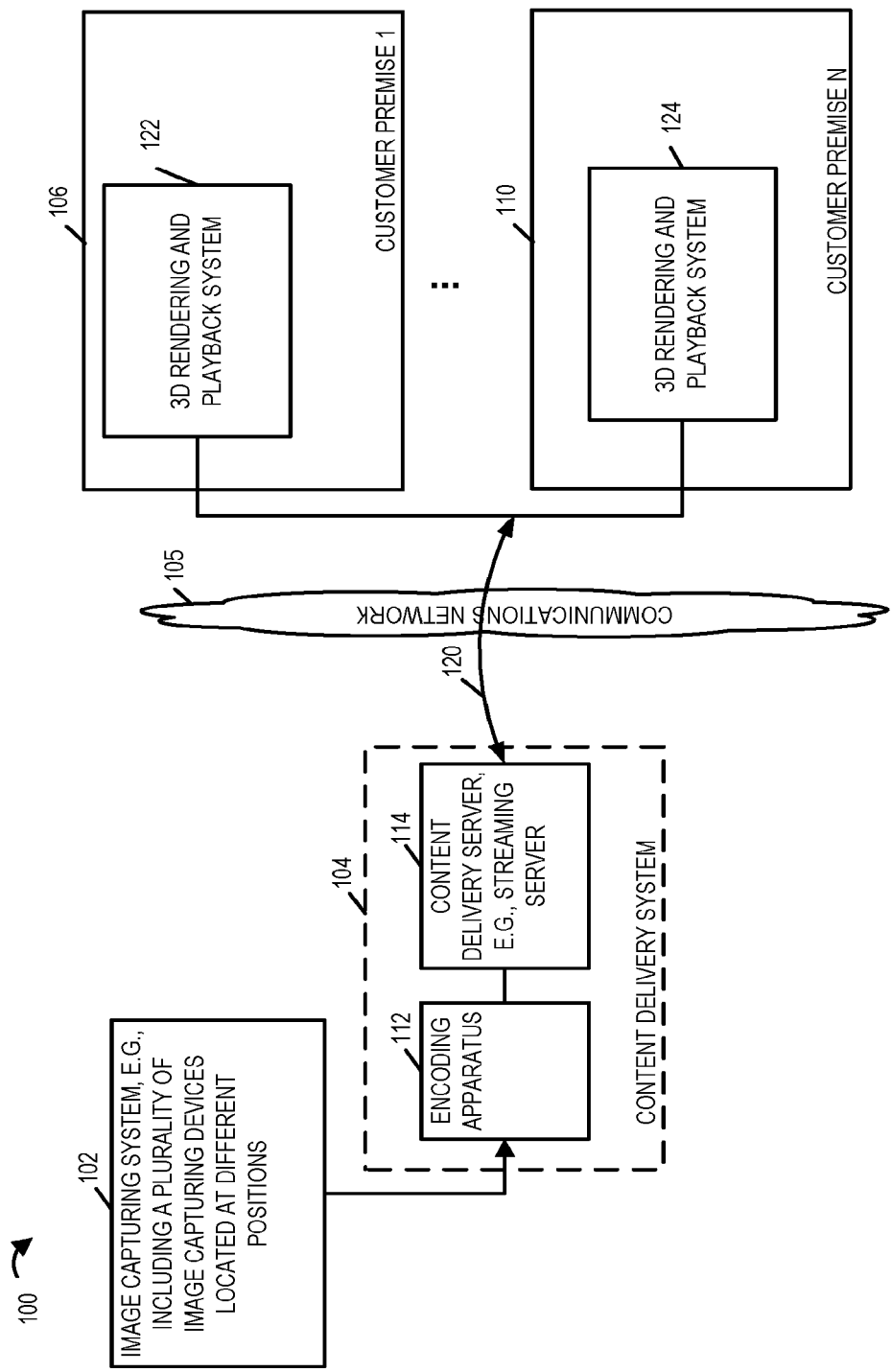
FIG. 1 illustrates an exemplary system implemented in accordance with some embodiments of the invention which can be used to capture and stream content for subsequent display by one or more users along with one or more synthesized portions of an environment.

FIG. 1 illustrates an exemplary system 100 implemented in accordance with some embodiments of the invention. The system 100 supports content delivery, e.g., imaging content delivery, to one or more customer devices, e.g., 3D capable playback devices located at customer premises. The system 100 includes the exemplary image capturing system 102, a content delivery system 104, a communications network 105, and a plurality of customer premises (customer premises 1 106, . . . , customers premises N 110). The image capturing system 102 supports capturing of stereoscopic imagery, e.g., using stereoscopic camera pairs, as well as capturing of normal non-stereoscopic imagery. The image capturing system 102 captures and processes imaging content in accordance with the features of the invention and may include a plurality of cameras/stereoscopic camera pairs corresponding to different camera positions in an environment for capturing images. The communications network 105 may be, e.g., a hybrid fiber-coaxial (HFC) network, satellite network, and/or internet.

The content delivery system 104 includes an encoding apparatus 112 and a content delivery device/server 114, e.g., a content delivery server, e.g., a content delivery streaming server. The encoding apparatus 112 may, and in some embodiments does, include one or a plurality of encoders for encoding image data. The encoders may be used in parallel to encode different portions of a scene and/or to encode a given portion of a scene to generate encoded versions which have different data rates. Using multiple encoders in parallel can be particularly useful when real time or near real time streaming is to be supported. In some embodiments multiple different encoders are used in parallel to encode streams captured by different camera devices placed at different camera positions to capture images to allow the streaming device 114 to stream content corresponding to different camera positions based in a user selection.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as indicated in FIG. 1 by the link 120 traversing the communications network 105. While the encoding apparatus 112 and content delivery server 114 are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premises 106, 110 may include one or more devices/systems, e.g., devices capable of decoding, rendering, playback, image transforming, and display of the imaging content streamed by the content streaming device 114. Customer premises 1 106 includes a 3D rendering and playback system 122 while customer premise N 110 includes 3D rendering and playback system 124. In some embodiments the 3D rendering and playback systems 122, 124 are capable of rendering and displaying 3D imaging content in accordance with the invention.

In various embodiments the 3D rendering and playback systems 122, 124 may decode the imaging content received from the content delivery system 104, generate imaging content using the decoded content, and render the imaging content, e.g., 3D image content, on a display e.g., a stereoscopic display. In various embodiments the 3D rendering and playback systems 122, 124 are capable of performing additional processing, e.g., tracking user's head position and/or line of sight to determine which camera position the user wants to view the environment from and accordingly switch to displaying in accordance with the features of the invention. In various embodiments the 3D rendering and playback systems 122, 124 are capable of performing additional processing on received images, e.g., transforming a left eye image as a function of an left image display area arranged at an angle relative to a user's left eye and transforming a right eye image as a function of an right image display area arranged at an angle relative to a user's right eye, in accordance with the features of the invention.

Figure 2:
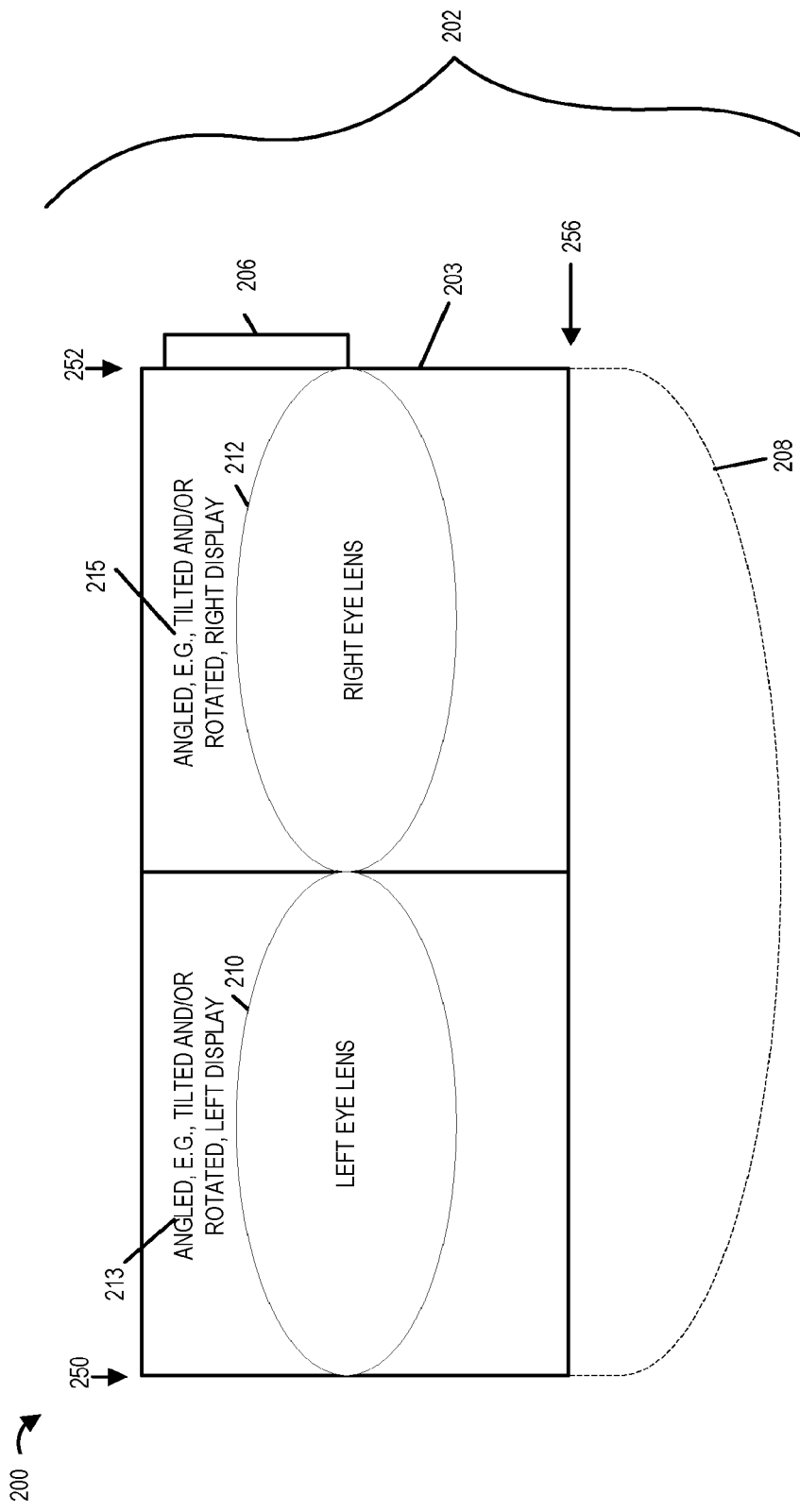
FIG. 2 illustrates an exemplary rendering and playback system, e.g., 3D rendering and playback system, implemented in accordance with one exemplary embodiment of the invention.

FIG. 2 illustrates an exemplary 3D rendering and playback system 200, implemented in accordance with one exemplary embodiment of the invention. The exemplary 3D rendering and playback system 200 may be used to display content captured by one or multiple cameras of the imaging system 102 and streamed by the content delivery system 104 to a user, e.g., a customer corresponding to customer premises 106, 110, in accordance with one exemplary embodiment. The exemplary 3D rendering and playback system 200 may be used as any of the 3D rendering and playback systems (122, . . . , 124) shown in FIG. 1. FIG. 2 shows a rear view of the 3D rendering and playback system 200 from the perspective of a user as if the user is going to wear, e.g., head mount, the rendering and playback 200. Thus the illustrated view in FIG. 2 shows at least some elements that may be visible from the rear, e.g., looking into the rendering system 200 from the rear. The exemplary 3D rendering and playback system 200 includes a headmount assembly 202, a user input interface 206, a pair of lenses 210, 212, a tilted and/or rotated left display 213, a tilted and/or rotated right display 215, and a head strap 208. In FIG. 2, left display 213 is visible through left eye lens 210, and the right display 215 is visible through right eye lens 212. In some embodiments, system 200 includes a smartphone insert slot; a smartphone is inserted into the smartphone insert slot, and the smartphone's display is used in place of left display 213 and right display 215. In some embodiments, device 200 includes a single permanently mounted angled, e.g., tilted and/or rotated, display in place of left display 213 and right display 215, e.g., with different portions of the single angled display corresponding to the left display 213 and right display 215. The head mounted display assembly 202 includes a display housing 203 in which one or more displays, e.g., display 213 and display 215 are mounted in an angled positions, e.g., tilted and/or rotated. Display housing 203 has a left side 250 and a right side 252.

Figure 4:
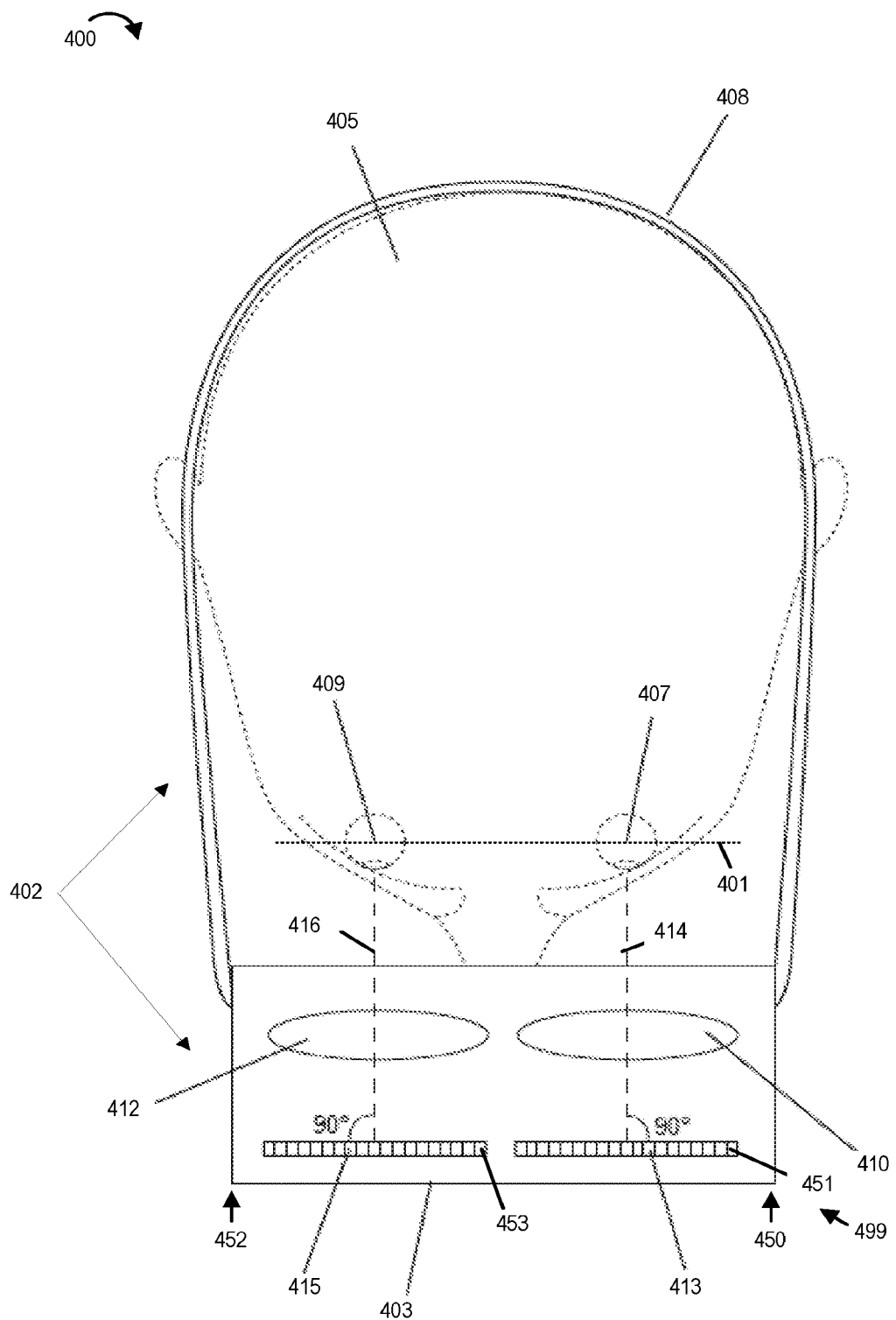

Displays may be mounted in the manner shown in FIG. 4, with displays (413, 415) being mounted perpendicular to axis (414, 416), respectively. In FIG. 4, the left eye display 413 is mounted perpendicular to the left side 450 of the display housing 403; and the right eye display 415 is mounted perpendicular to the right side 452 of the display housing 403. Lens 410 is positioned between left eye display 413 and left eye position 407. Lens 412 is positioned between right eye display 415 and right eye position 409. The display mounting shown in FIG. 4 is a conventional display mounting. FIG. 4 shows a head mount with displays (413, 415) that are mounted in a normal manner so that they will be viewed by a user's eyes straight on.

Figure 5:
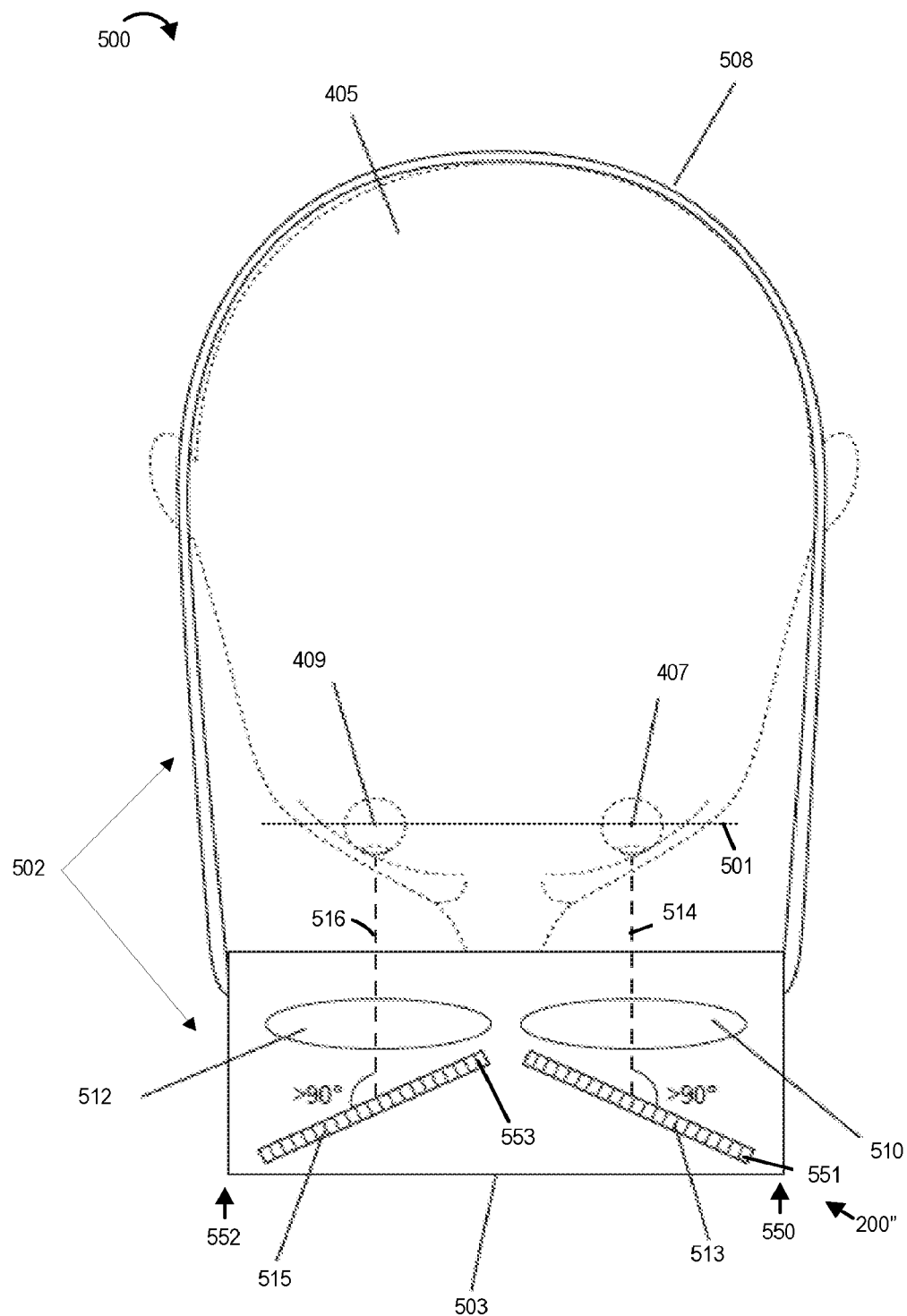
FIG. 5 illustrates a headmounted display system in accordance with an exemplary embodiment of the invention including left and right eye displays mounted at angles so that they will not be viewed straight on but at an angle allowing for a higher perceived resolution than the FIG. 4 system since more displayed pixels will be observed per unit area of eye surface than will be viewed by the eyes in FIG. 4; the displays in FIG. 5 may be and sometimes are larger, e.g., longer and/or taller than those shown in FIG. 4.

The system 200", implemented in accordance with an exemplary embodiment of the present invention, shown in FIG. 5 is an embodiment of the system 200 shown in FIG. 2 which uses displays (left display 513, right display 515) mounted in the housing 503 at angles, e.g. predetermined angles which are not 90 degrees with respect to an axis (514, 516), respectively, so that the user will see the displays (513, 515) at an angle rather than straight on. In FIG. 5, the left eye display 513 is mounted at a non 90 degree angle with respect to the left side 550 of the display housing 503; and the right eye display 515 is mounted at a non 90 degree angle with respect to the right side 552 of the display housing 503.

The system 200 can act as a rendering and playback device, e.g., performing processing, rendering, playback, transformations, and various operations for the system 200. When mounted on a user's head by a user, the user can view a displayed scene, e.g., a simulated 3D environment including content corresponding to a scene, through the lenses 210, 212. The simulated 3D environment displayed to the user allows for a real life 3D experience as if the user is actually present in the simulated environment.

Via the user input interface 206 user input is detected and actions are taken by the rendering and playback system 200. For example in some embodiments a user input via the interface 206 may indicate selection of a camera position selected by the user for viewing content in accordance with the features of the invention. In some embodiments the user input interface 206 includes a touchpad over which the user can move his fingers and a corresponding pointer, visible to the user on the display screen, moves along allowing the user to interact with objects displayed on the screen. In such embodiments the user may control the pointer to interact, e.g., select, move, delete etc., with icons and/or objects displayed on the screen. For example in some embodiments via the interface 206 the user may drag a pointer to a highlighted camera position of user's choosing and select the camera position, e.g., by tapping on the touchpad of interface 206, for viewing content corresponding to the selected camera position.

Figure 3:
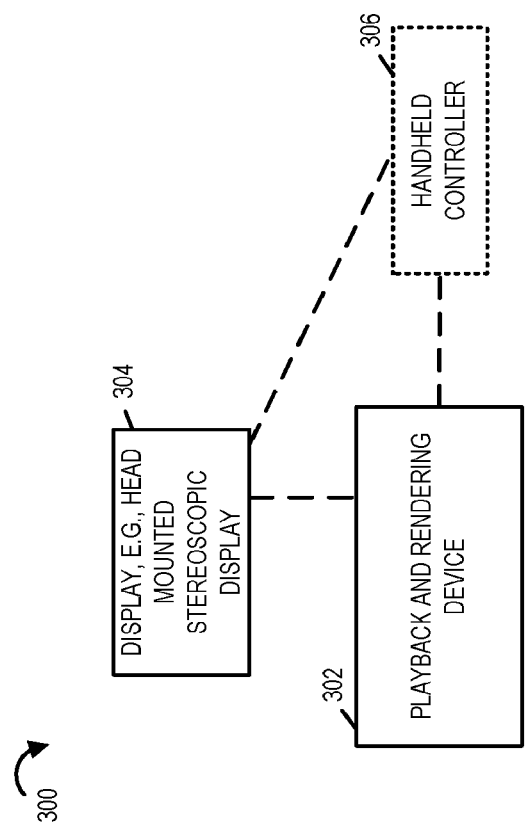
FIG. 3 illustrates another exemplary rendering and playback system implemented in accordance with some other embodiments of the invention.

FIG. 3 illustrates another rendering and playback system 300, implemented in accordance with some embodiments of the invention. The rendering and playback system 300 may be used as any of the exemplary 3D rendering and playback systems (122, . . . , 124) shown in FIG. 1. The rendering and playback system 300 may be used to implement the methods of the present invention and present content to a user from the perspective of a user desired camera position. The exemplary 3D rendering and playback system 300 includes a playback and rendering device 302, e.g., a gaming console such as PS3, PS4 or other play station version, an Xbox version etc. In addition the rendering and playback system 300 further includes a display 304 including one or more angled, e.g., tilted and/or rotated, display screens or display screen portions, and optionally a handheld controller 306. The elements 302, 304 and 306 of the system 300 may be wired and/or wirelessly connected (e.g., dashed lines indicating wired and/or wirelessly links). The display 304 in some embodiments is a head mounted stereoscopic display including one or more angled, e.g. tilted and/or rotated, display screens, while in some other embodiments the display 304 may be another display device including one or more angled, e.g., tilted and/or rotated display screens, capable of displaying stereoscopic imaging content. In some embodiments the head mounted stereoscopic display 304 includes one or more sensors configured to track a user's head movement and/or detect a change in a user's head position. In some embodiments the playback and rendering device 302 includes one or more sensors, e.g., cameras, track user's head movement and/or detect a change in user's head position.

FIG. 4 shows display screens (413, 415) mounted so that the user views the screens (413, 415) straight on. Drawing 400 of FIG. 4 illustrates a user's head 405 including a left eye 407 and a right eye 409, and further includes 3D rendering and playback system 499. Consider that the user is wearing headmount assembly 402 with headstrap 408 around the user's head 405 and the display housing 403 being against the front of the user's face, and there is a user left eye position 407, and a user right eye position 409. In the embodiment shown in FIG. 4, the displays (413, 415) are arranged perpendicular to the user's view. Axis 414 extends from the left eye 407 to the viewing surface of left display 413, and there is an angle of 90 degrees between axis 414 and the viewing surface of the left display 413. Axis 416 extends from the right eye 409 to the viewing surface of right display 415, and there is an angle of 90 degrees between axis 416 and the viewing surface of the right display 415. In the FIG. 4 embodiment, the display screens (413, 415) are mounted parallel to line 401 which extends through the user's eyes.

FIG. 5 shows display screens (513, 515) mounted in a housing 503 in accordance with one exemplary embodiment of the invention so the user sees the screens (513, 515) at an angle and thus will perceive a higher resolution than will be perceived in the system shown in FIG. 4. Drawing 500 of FIG. 5 illustrates a user's head 405 including a left eye 407 and a right eye 409, and further includes exemplary 3D rendering and playback system 200" in accordance with one exemplary embodiment. Lens 510 is positioned between left eye display 513 and left eye position 407. Lens 512 is positioned between right eye display 515 and right eye position 409. Consider that the user's head 405 is in head mount assembly 502 with headsstrap 508 around the user's head and with the front of the user's face against the display housing 503, and there is a user left eye position 407, and a user right eye position 409. Lens 510 is positioned between left eye display 513 and left eye position 407. Lens 512 is positioned between right eye display 515 and right eye position 409. In the embodiment shown in FIG. 5, the displays (513, 515) are arranged angled with respect to the user's view. Axis 514 extends from the left eye 407 to the viewing surface of left display 513, and there is an angle between axis 514 and the viewing surface of the left display 513, wherein the angle is a value which is not 90 degrees, e.g., the angle is a predetermined value greater than 90 degrees. Axis 516 extends from the right eye 409 to the viewing surface of right display 515, and there is an angle between axis 516 and the viewing surface of the right display 516, wherein angle is a value which is not 90 degrees, e.g., the angle is a predetermined value greater than 90 degrees. In one exemplary embodiment the angle for the left side is the same as has the angle for the right side. In one exemplary embodiment the same value is a predetermined value in the range of 95 degrees to 135 degrees. In another exemplary embodiment the same value is a predetermined value in the range of 45 to 85 degrees. In the FIG. 5 embodiment, the display screens (513, 515) are not mounted parallel to line 501, e.g., are mounted in angled positions with respect to line 501, which extends through the user's eyes. In the FIG. 5 embodiment, the left eye display 513 is mounted at a non 90 degree angle with respect to the left side 550 of the display housing 503; and the right eye display 515 is mounted at a non 90 degree angle with respect to the right side 552 of the display housing 503.

Figure 6:
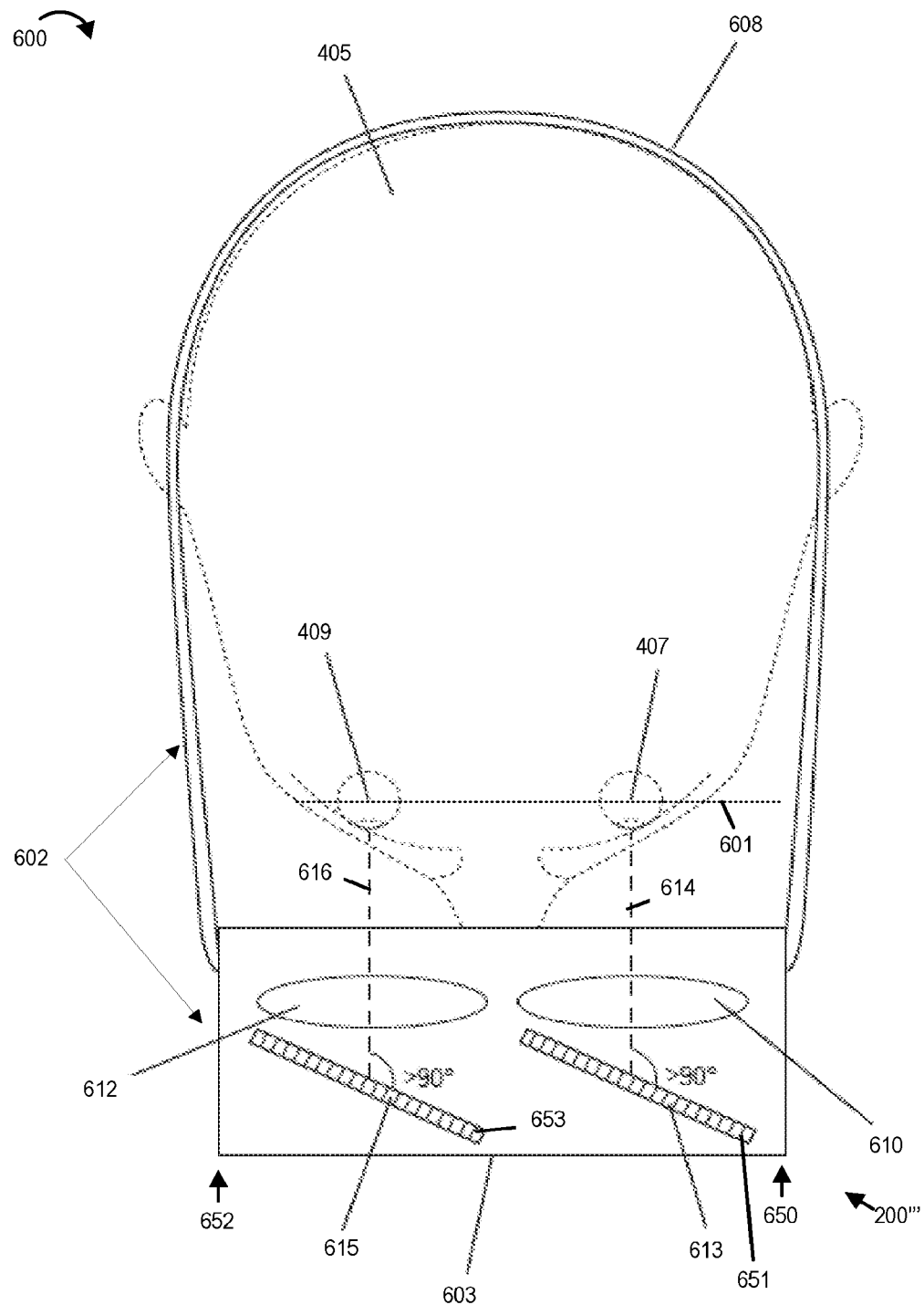
FIG. 6 illustrates another exemplary headmounted display system in accordance with an exemplary embodiment of the invention including left and right eye displays mounted at angles so that they will not be viewed straight on but at an angle allowing for a higher perceived resolution than the FIG. 4 system since more displayed pixels will be observed per unit area of eye surface than will be viewed by the eyes in FIG. 4.

FIG. 6 shows display screens (613, 615) mounted in a housing 603 in accordance with one exemplary embodiment of the invention so the user sees the screens (613, 615) at an angle and thus will perceive a higher resolution than will be perceived in the system shown in FIG. 4. Drawing 600 of FIG. 6 illustrates a user's head 405 including a left eye 407 and a right eye 409, and further includes exemplary 3D rendering and playback system 200' in accordance with one exemplary embodiment. Consider that the user's head 405 is in head mount assembly 602 with headstrap 608 around the user's head 405 and with the front of the user's face against the display housing 603, and there is a user left eye position 407, and a user right eye position 409. Lens 610 is positioned between left eye display 613 and left eye position 407. Lens 612 is positioned between right eye display 615 and right eye position 409. In the embodiment shown in FIG. 6, the displays (613, 615) are arranged angled with respect to the user's view. Axis 614 extends from the left eye 407 to the viewing surface of left display 613, and there is an angle between axis 614 and the viewing surface of the left display 613, wherein the angle is a value which is not 90 degrees, e.g., the angle is a predetermined value greater than 90 degrees. Axis 616 extends from the right eye 409 to the viewing surface of right display 615, and there is an angle between axis 616 and the viewing surface of the right display 615, wherein angle is a value which is not 90 degrees, e.g., the angle is a predetermined value greater than 90 degrees. In one exemplary embodiment the angle for the left side is the same as has the angle for the right side. In one exemplary embodiment the same value is a predetermined value in the range of 95 degrees to 135 degrees. In another exemplary embodiment the same value is a predetermined value in the range of 45 to 85 degrees. In the FIG. 6 embodiment, the display screens (613, 615) are not mounted parallel to line 601, e.g., are mounted in angled positions with respect to line 601, which extends through the user's eyes. In the FIG. 6 embodiment, the left eye display 613 is mounted at a non 90 degree angle with respect to the left side 650 of the display housing 603; and the right eye display 615 is mounted at a non 90 degree angle with respect to the right side 652 of the display housing 503.

Left and right of the display screens ((513, 515), (613, 615)) are dark masks to avoid reflections of light, e.g., light which is not directed towards a user's eyes (407, 409) due to the display screens ((513, 515), (613, 615)) being mounted at an angle. Note that in FIGS. 4, 5, and 6 the boxes are used to represent pixels of a display. In FIG. 4, box 451 represents a pixel of left display 413 and box 453 represents a pixel of right display 415. In FIG. 5, box 551 represents a pixel of left display 513 and box 553 represents a pixel of right display 515. In FIG. 6, box 651 represents a pixel of left display 613 and box 653 represents a pixel of right display 615. More pixels will be observed in the FIG. 5 arrangement than in the FIG. 4 arrangement. This is due to the use of larger screens (513, 515) in the FIG. 5 embodiment and the mounting configuration of FIG. 5 where the screen (513, 515) are mounted at an angle to the user's eyes (407, 409) rather than parallel to the user's face and eyes. Thus while the display screens (413, 415) of FIG. 4 and the display screens (513, 515) of FIG. 5 may each have the same dot pitch and pixels per square inch of the display, the user will perceive the displays (513, 515) of FIG. 5 as being of higher resolution than the displays (413, 415) of FIG. 4 since the eyes (407, 409) will see more pixels. That is for each square inch of eye area a user will see more pixels in the FIG. 5 embodiment than in the FIG. 4 embodiment because of the screen arrangement.

Similarly, more pixels will be observed in the FIG. 6 arrangement than in the FIG. 4 arrangement. This is due to the use of larger screens (613, 615) in the FIG. 6 embodiment and the mounting configuration of FIG. 6 where the screen (613, 615) are mounted at an angle to the user's eyes (407, 409) rather than parallel to the user's face and eyes. Thus while the display screens (413, 415) of FIG. 4 and the display screens (613, 615) of FIG. 6 may each have the same dot pitch and pixels per square inch of the display, the user will perceive the displays (613, 615) of FIG. 6 as being of higher resolution than the displays (413, 415) of FIG. 4 since the eyes (407, 409) will see more pixels. That is for each square inch of eye area a user will see more pixels in the FIG. 6 embodiment than in the FIG. 4 embodiment because of the screen arrangement.

Figure 7:
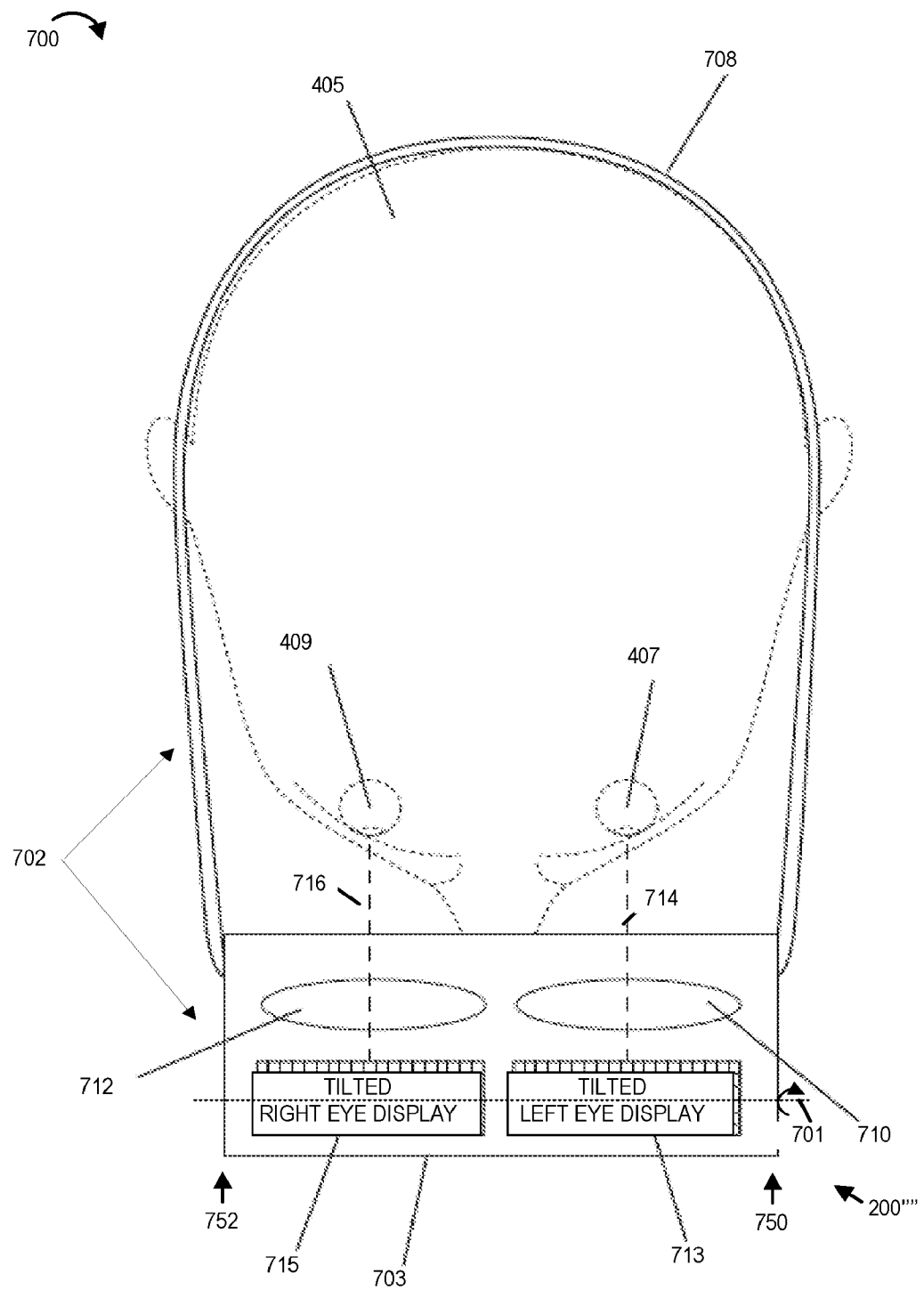
FIG. 7 illustrates an exemplary headmounted display system in accordance with an exemplary embodiment of the invention including left and right eye tilted displays, which are tiled at an angle allowing for a higher perceived resolution than the FIG. 4 system since more displayed pixels will be observed per unit area of eye surface than will be viewed by the eyes in FIG. 4.

FIG. 7 illustrates an exemplary headmounted display system, in accordance with an exemplary embodiment of the invention, including left and right eye tilted displays (713, 715), which are tiled at an angle allowing for a higher perceived resolution than the FIG. 4 system since more displayed pixels will be observed per unit area of eye surface than will be viewed by the eyes in FIG. 4. Drawing 700 of FIG. 7 illustrates a user's head 405 including a left eye 407 and a right eye 409, and further includes exemplary 3D rendering and playback system 200"" in accordance with one exemplary embodiment. Consider that the user's head 405 is in head mount assembly 702 with headstrap 708 around the user's head and with the front of the user's face against the display housing 703, and there is a user left eye position 407, and a user right eye position 409. Lens 710 is positioned between left eye display 713 and left eye position 407. Lens 712 is positioned between right eye display 715 and right eye position 409. In the embodiment shown in FIG. 7, the displays (713, 715) are arranged angled with respect to the user's view. Axis 714 extends from the left eye 407 to the viewing surface of left display 713, and there is an angle between axis 714 and the viewing surface of the left display 713, wherein angle is a value which is not 90 degrees, e.g., the angle is a predetermined value greater than 90 degrees. Axis 716 extends from the right eye 409 to the viewing surface of right display 715, and there is an angle between axis 716 and the viewing surface of the right display 715, wherein angle is a value which is not 90 degrees, e.g., the angle is a predetermined value greater than 90 degrees. In one exemplary embodiment the angle for the left side is the same as has the angle for the right side, and the displays (713, 715) are mounted in a predetermined rotated position about axis 701 such that the user is viewing tilted screens. In one exemplary embodiment the same value is a predetermined value in the range of 95 degrees to 135 degrees. In another exemplary embodiment the same value is a predetermined value in the range of 45 to 85 degrees. In some embodiments, a reference angle about axis 701 is 0 degrees for vertically mounted displays, and for the embodiment of FIG. 7, the tilt angle measured about axis 701 with respect to the reference angle is a predetermined value in one or the ranges of: i) +5 degrees to +45 degrees or ii) −5 degrees to −45 degrees.

Figure 8:
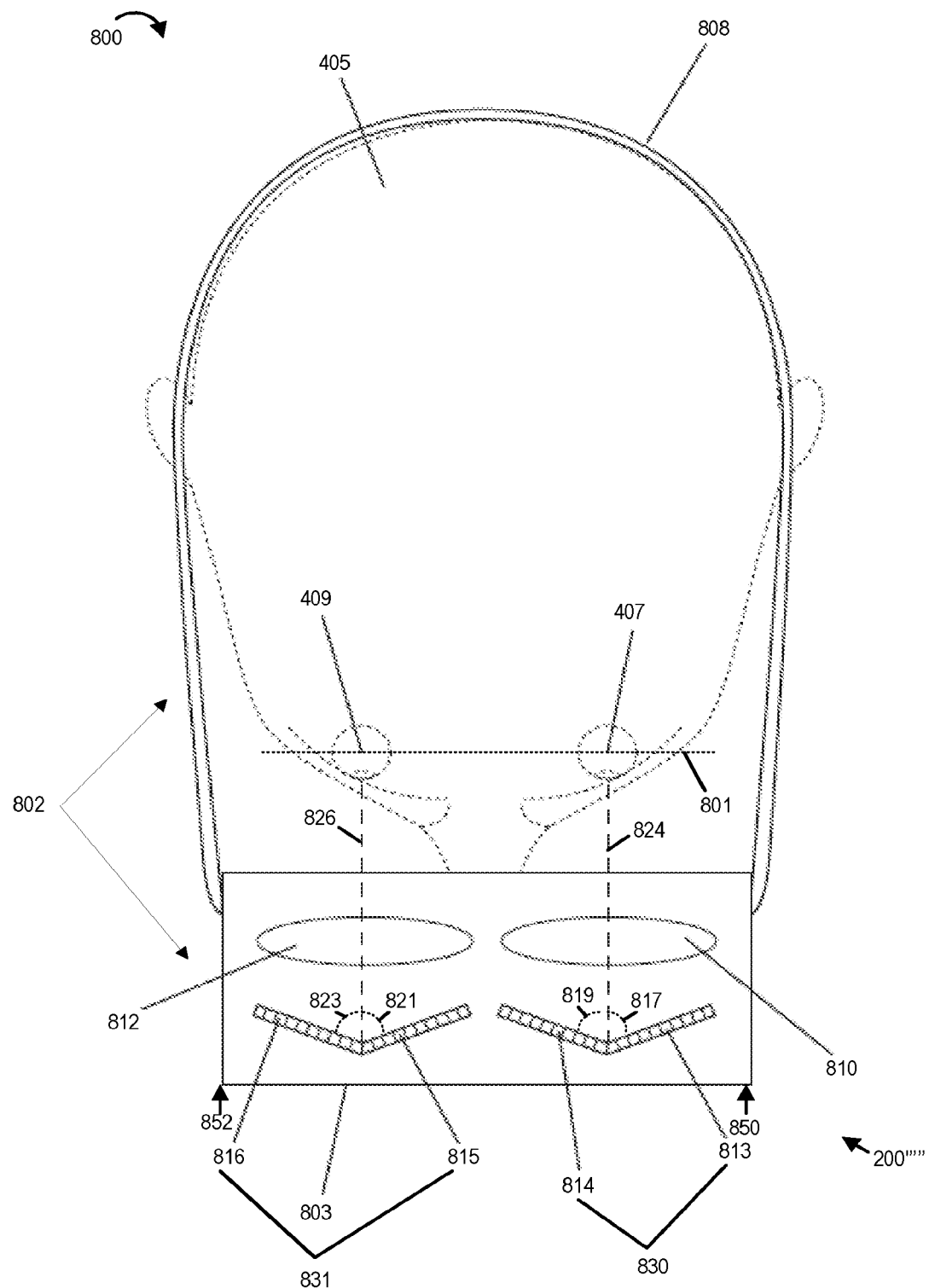
FIG. 8 illustrates an exemplary headmounted display system in accordance with an exemplary embodiment of the invention including left and right eye display portions mounted at angles so that they will not be viewed straight on but at an angle allowing for a higher perceived resolution than the FIG. 4 system since more displayed pixels will be observed per unit area of eye surface than will be viewed by the eyes in FIG. 4.

FIG. 8 illustrates an exemplary headmounted display system, in accordance with an embodiment of the present invention, including left and right eye display portions ((813, 814), (815, 816)) mounted at angles so that they will not be viewed straight on but at an angle allowing for a higher perceived resolution than the FIG. 4 system since more displayed pixels will be observed per unit area of eye surface than will be viewed by the eyes in FIG. 4. The exemplary embodiment of FIG. 8 is similar to the FIG. 6 embodiment; however, the FIG. 8 embodiment uses two differently angled portions (813, 814) for the left eye display and two differently angled portions (815, 816) for the right eye display.

FIG. 8 shows left eye display screen portions (813, 814) and right eye display screen portions (815, 816) mounted in a housing 803 in accordance with one exemplary embodiment of the invention so the user sees the screen portions (813, 814, 815, 816) at an angle and thus will perceive a higher resolution than will be perceived in the system shown in FIG. 4. Drawing 800 of FIG. 8 illustrates a user's head 405 including a left eye 407 and a right eye 409, and further includes exemplary 3D rendering and playback system 200"" in accordance with one exemplary embodiment. Consider that the user's head 405 is in head mount assembly 802 with headstrap 808 around the user's head 405 and with the front of the user's face against the display housing 803, and there is a user left eye position 407, and a user right eye position 409. Lens 810 is positioned between left eye display 830, comprising the combination of display portions (813, 814), and left eye position 407. Lens 812 is positioned between right eye display 831, comprising the combination of display portions (815, 816), and right eye position 409. In the embodiment shown in FIG. 8, the display portions (813, 814, 815, 817) are arranged angled with respect to the user's view. Axis 824 extends from the left eye 407 to the interface between the viewing surface of two left display portions 813, 815 and there is an angle (817, 819) between axis 824 and each of the viewing surfaces of the left display portions (813, 814) wherein the angle is a value which is not 90 degrees, e.g., the angle is a predetermined value less than 90 degrees. Axis 826 extends from the right eye 409 to the interface between the viewing surfaces of right display portions (815, 816) and there is an angle (821, 823) between axis 826 and the each of the viewing surfaces of the right display portions (815, 816) wherein angle is a value which is not 90 degrees, e.g., the angle is a predetermined value less than 90 degrees. In one exemplary embodiment the angle for the left side portions is the same as the angle for the right side portions. In some exemplary embodiments the same value is a predetermined value in the range of 45 to 85 degrees. In some exemplary embodiments the same value is a predetermined value in the range of 95 degrees to 135 degrees. In the FIG. 8 embodiment, the display screen portions ((813, 814), (815, 816)) are not mounted parallel to line 801, e.g., are mounted in angled positions with respect to line 801, which extends through the user's eyes. In the FIG. 8 embodiment, the display screen portions ((813, 814), (815, 816)) are not mounted perpendicular to the sides (852, 842), e.g., display screen portions ((813, 814), (815, 816)) are mounted in angled positions with respect to housing sides (850, 852).

Figure 9:
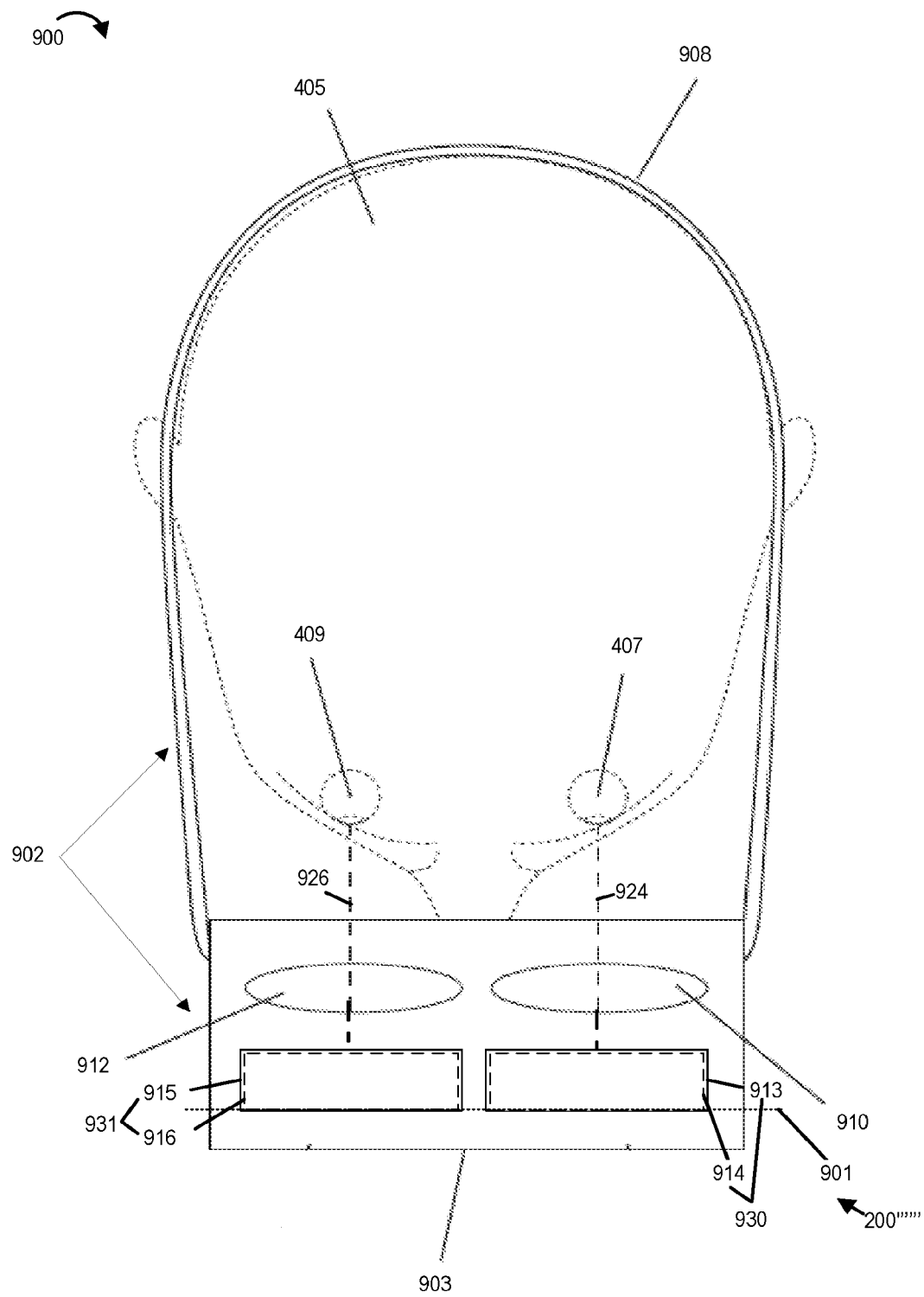
FIG. 9 illustrates an exemplary headmounted display system in accordance with an exemplary embodiment of the invention including left and right eye tilted display portions, which are tiled at angles allowing for a higher perceived resolution than the FIG. 4 system since more displayed pixels will be observed per unit area of eye surface than will be viewed by the eyes in FIG. 4.

FIG. 9 illustrates an exemplary headmounted display system in accordance with an exemplary embodiment of the invention including left and right eye tilted display portions ((913, 915), (914, 916)), which are each tiled at an angle allowing for a higher perceived resolution than the FIG. 4 system since more displayed pixels will be observed per unit area of eye surface than will be viewed by the eyes in FIG. 4. The exemplary embodiment of FIG. 9 is similar to the FIG. 7 embodiment; however, the FIG. 9 embodiment uses two differently angled portions (913, 914) for the left eye display and two differently angled portions (915, 916) for the right eye display.

Drawing 900 of FIG. 9 illustrates a user's head 405 including a left eye 407 and a right eye 409, and further includes exemplary 3D rendering and playback system 200""' in accordance with one exemplary embodiment. Consider that the user's head 405 is in head mount assembly 902 with headstrap 908 around the user's head and with the front of the user's face against the display housing 903, and there is a user left eye position 407, and a user right eye position 409. Lens 910 is positioned between left eye display 930, comprising the combination of display portions (913, 914), and left eye position 407. Lens 912 is positioned between right eye display 931, comprising the combination of display portions (915, 916), and right eye position 409. In the embodiment shown in FIG. 9, the display portions ((left upper display portion 913, left lower display potion 914), (right upper display portion 915, right lower display portion 916)) are arranged angled with respect to the user's view. Axis 924 extends from the left eye 407 to the interface of viewing surfaces of tilted left display portions (913, 915) and there is an angle between axis 914 and the viewing surface of each of the left display portions (913, 914) wherein angle is a value which is not 90 degrees, e.g., the angle is a predetermined value less than 90 degrees. Axis 916 extends from the right eye 409 to the interface of the viewing surfaces of the tilted right display portions (915, 916), and there is an angle between axis 916 and the viewing surface of each of the right display portions (915, 916), wherein angle is a value which is not 90 degrees, e.g., the angle is a predetermined value less than 90 degrees. In one exemplary embodiment the angle for each of the left side portions is the same as has the angle for each of the right side portions, and the display portions (913, 914, 915, 916) are each mounted in a rotated position about axis 901 such that the user is viewing tilted screen portions. In another exemplary embodiment the same value is a predetermined value in the range of 45 to 85 degrees. In one exemplary embodiment the same value is a predetermined value in the range of 95 degrees to 135 degrees.

Figure 10:
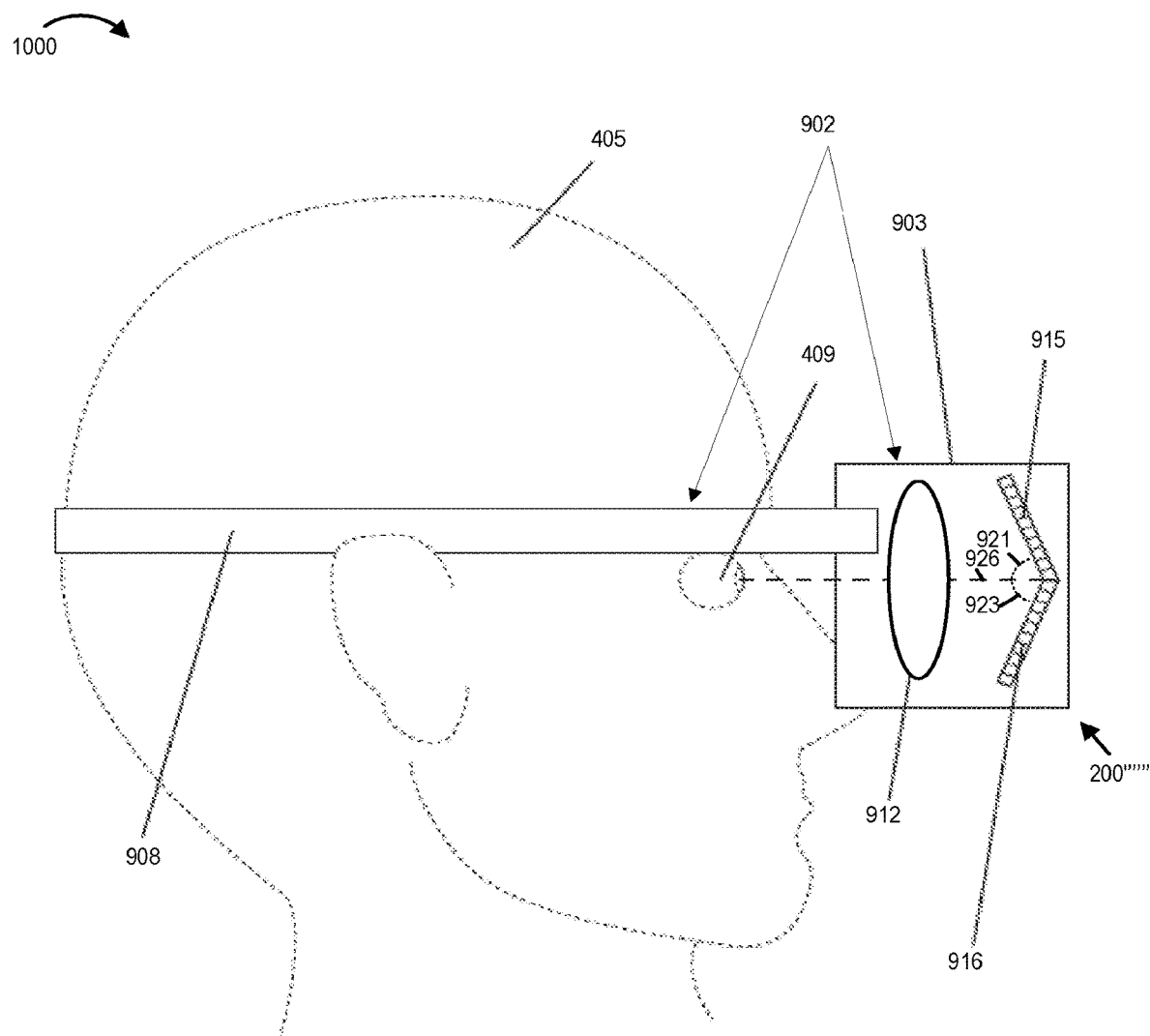
FIG. 10 is a right side view of the exemplary head-mounted display system of FIG. 9, which illustrates upper and lower display portions of the right eye display.

FIG. 10 is a drawing 1000 illustrating a right side view of the exemplary headmounted display system of FIG. 9, which illustrates upper and lower display portions (915, 916) of the right eye display 931 and further illustrates an angle 921 between the upper right display portion 915 and axis 926, and an angle 923 between the lower right display portion 916 and axis 926.

Figure 13:
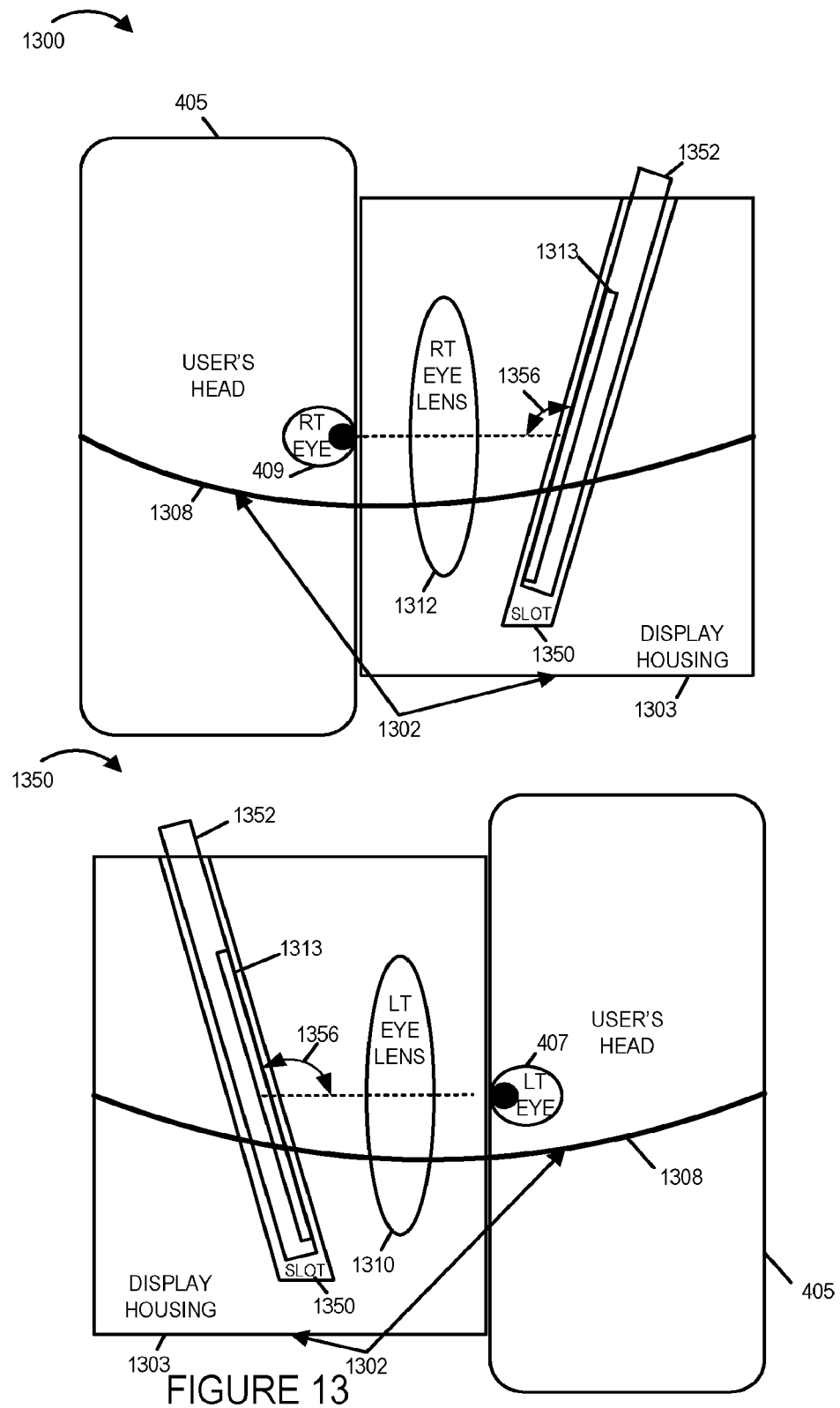
FIG. 13 is a drawing of an exemplary headmounted display system in accordance with an exemplary embodiment of the invention including a titled slot into which a device, e.g., a smartphone, including a display is inserted.

FIG. 13 includes a drawing 1300 including a right side view of an exemplary headmounted display system 1302 in accordance with an exemplary embodiment of the invention including a titled slot 1350 into which a device 1352, e.g., a smartphone, including a display 1313 is inserted, and a drawing 1350 including a left side view of the exemplary headmounted display system 1302 including the titled slot 1350 into which a device 1352, e.g., a smartphone, including a display 1313 is inserted. The headmounted display system 1302 includes display housing 1303 including right eye lens 1312, left eye lens 1310, tilted slot 1350, and inserted device 1352 including display 1313. Headmounted display system 1302 further includes headstrap 1308 which goes around the user's head 405 to secure the display housing 1303 against the front of the user's face. There is a non 90 degree angle 1356 between an axis extending straight ahead forward from the user's right eye 409 to the display surface. There is a non 90 degree angle 1356 between an axis extending straight ahead forward from the user the user's left eye 407 to the display's viewing surface. In this exemplary embodiments different non-overlapping portions of screen 1313 are used to display the left and right images, e.g., of a transformed stereoscopic image pair. FIG. 13 illustrates an exemplary headmounted display system 1302 including a tilted display 1313, which is tiled at an angle allowing for a higher perceived resolution than the FIG. 4 system since more displayed pixels will be observed per unit area of eye surface than will be viewed by the eyes in FIG. 4.

Figure 14:
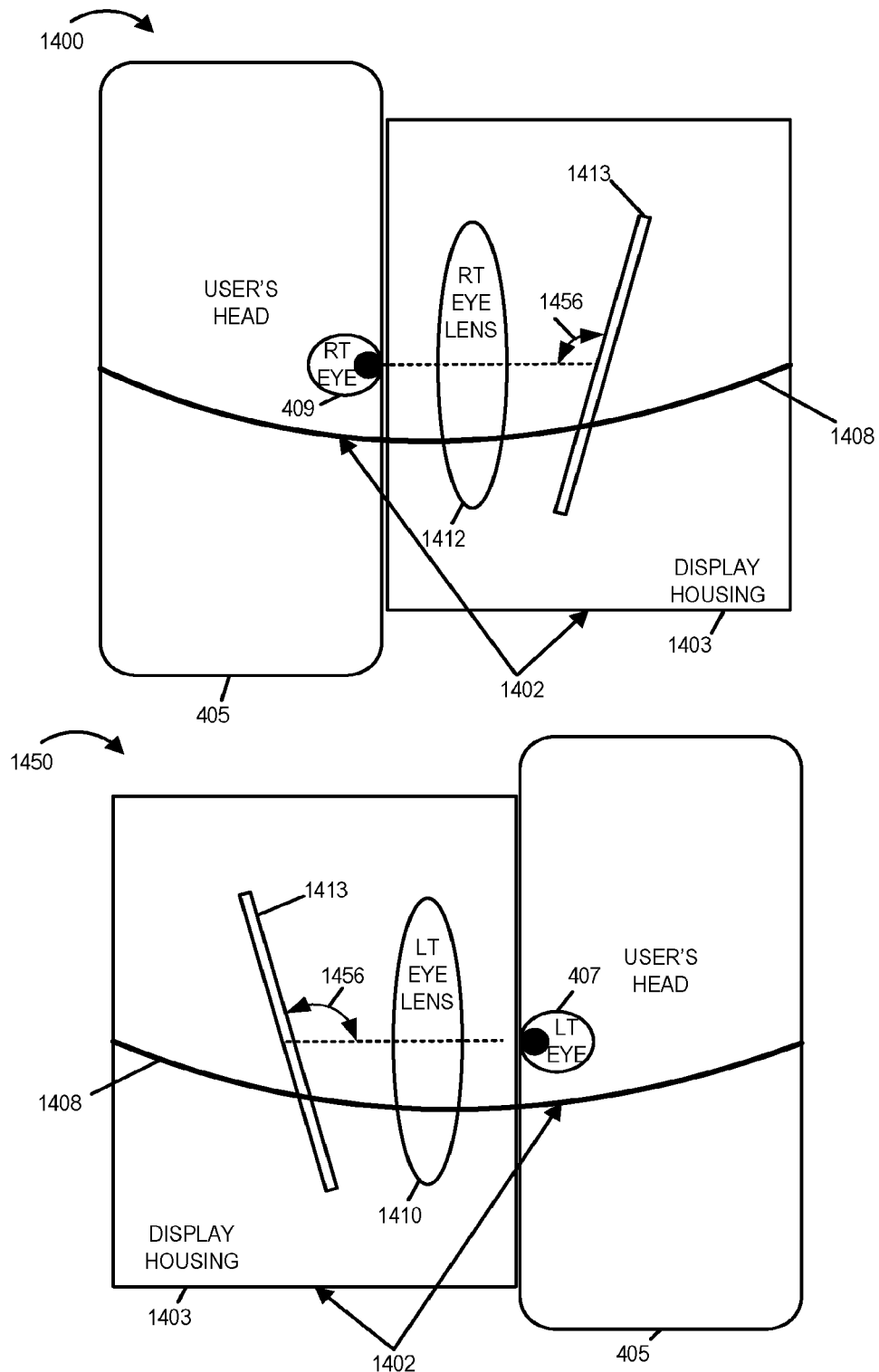
FIG. 14 is a drawing of an exemplary headmounted display system in accordance with an exemplary embodiment of the invention including a fixed tilted display in which a first portion of the display is used for viewing left eye images and a second portion of the display is used for viewing right eye images.

FIG. 14 includes a drawing 1400 including a right side view of an exemplary headmounted display system 1402 in accordance with an exemplary embodiment of the invention including a fixed tilted display 1413 in which a first portion of the display 1413 is used for viewing left eye images and a second portion of the display 1413 is used for viewing right eye images; and a drawing 1450 including a left side view of the exemplary headmounted display system 1402 including fixed tilted display 1413 in which a first portion of the display is used for viewing left eye images and a second portion of the display is used for viewing right eye images. The headmounted display system 1402 includes display housing 1403 including right eye lens 1412, left eye lens 1410 and tilted display 1413. Headmounted display system 1402 further includes headstrap 1408 which goes around the user's head 405 to secure the display housing 1403 against the front of the user's face. There is a non 90 degree angle 1456 between an axis extending straight ahead forward from the user the user's right eye 409 to the display surface. There is a non 90 degree angle 1456 between an axis extending straight ahead forward from the user the user's left eye 407 to the display's viewing surface. In this exemplary embodiments different non-overlapping portions of screen 1413 are used to display the left and right images, e.g., of a transformed stereoscopic image pair. FIG. 14 illustrates an exemplary headmounted display system including a tilted display 1413, which is tiled at an angle allowing for a higher perceived resolution than the FIG. 4 system since more displayed pixels will be observed per unit area of eye surface than will be viewed by the eyes in FIG. 4.

Figure 15:
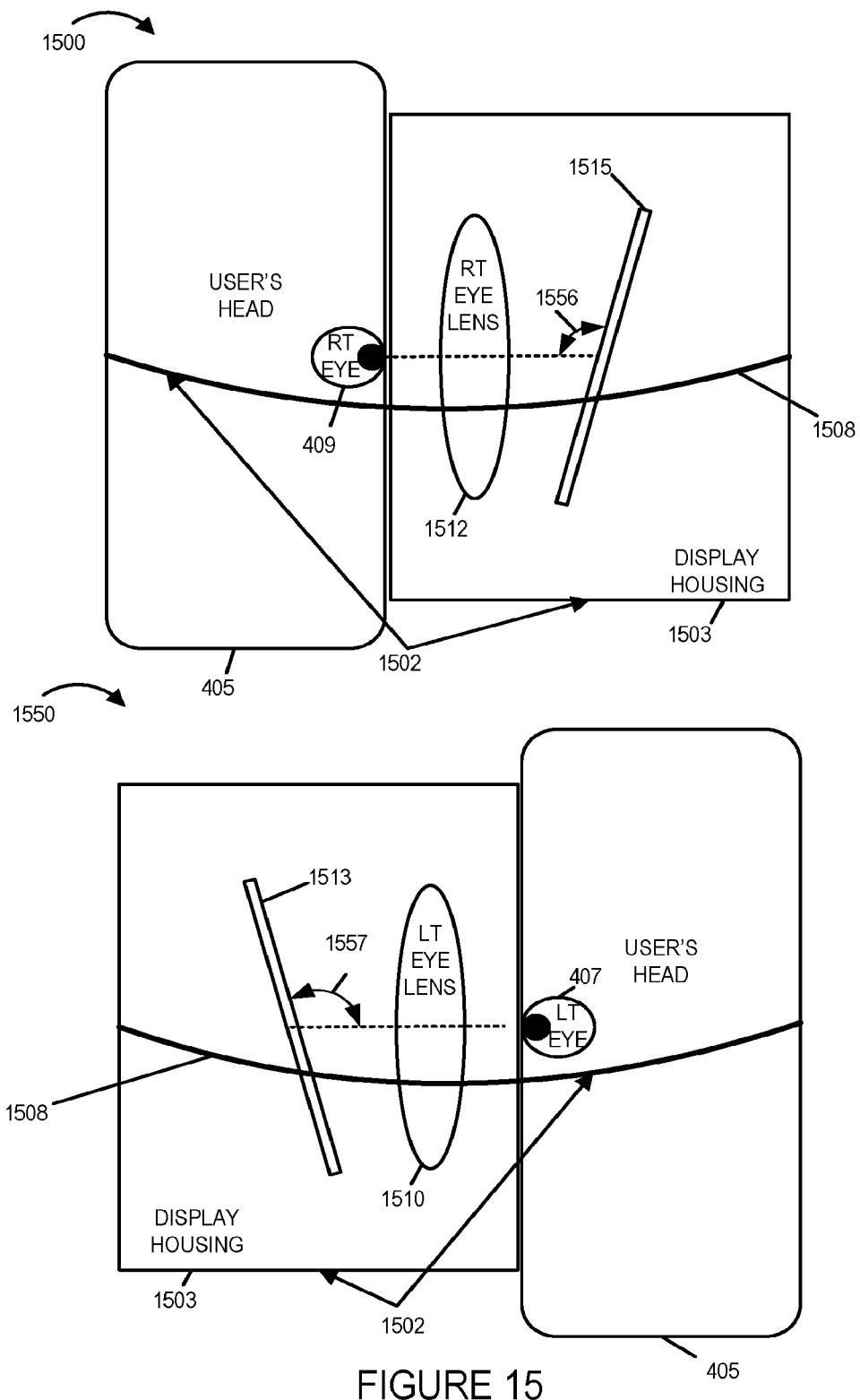
FIG. 15 is a drawing of an exemplary headmounted display system in accordance with an exemplary embodiment of the invention including two separate fixed tilted displays in which a first fixed tilted display is used for viewing left eye images and a second fixed tilted display is used for viewing right eye images.

FIG. 15 includes drawings of an exemplary headmounted display system 1502 including two separate fixed tilted displays (1513, 1515) in which a first fixed tilted display 1513 is used for viewing left eye images and a second fixed tilted display 1515 is used for viewing right eye images. FIG. 15 includes a drawing 1500 including a right side view of an exemplary headmounted display system 1502 and a drawing 1550 including a left side view of the exemplary headmounted display system 1502. The headmounted display system 1502 includes display housing 1503 including right eye lens 1512, left eye lens 1510, and right side tilted display 1515 and left side tilted display 1513. Headmounted display system 1502 further includes headstrap 1508 which goes around the user's head 405 to secure the display housing 1503 against the front of the user's face. There is a non 90 degree angle 1556 between an axis extending straight ahead forward from the user the user's right eye 409 to the surface of the right tilted display 1515. There is a non 90 degree angle 1557 between an axis extending straight ahead forward from the user the user's left eye 407 to the viewing surface of the left tilted display 1513. In some embodiments, angle 1556 is the same as angle 1557. In one exemplary embodiment angle 1556=angle 1557, which is a predetermined value in the range of 95 degree to 135 degrees. In another exemplary embodiment angle 1556=angle 1557, which is a predetermined value in the range of 85 degree to 45 degrees. FIG. 15 illustrates an exemplary headmounted display system 1502 including tilted displays (1515, 1513), which are tilted at angles allowing for a higher perceived resolution than the FIG. 4 system since more displayed pixels will be observed per unit area of eye surface than will be viewed by the eyes in FIG. 4.

Figure 16:
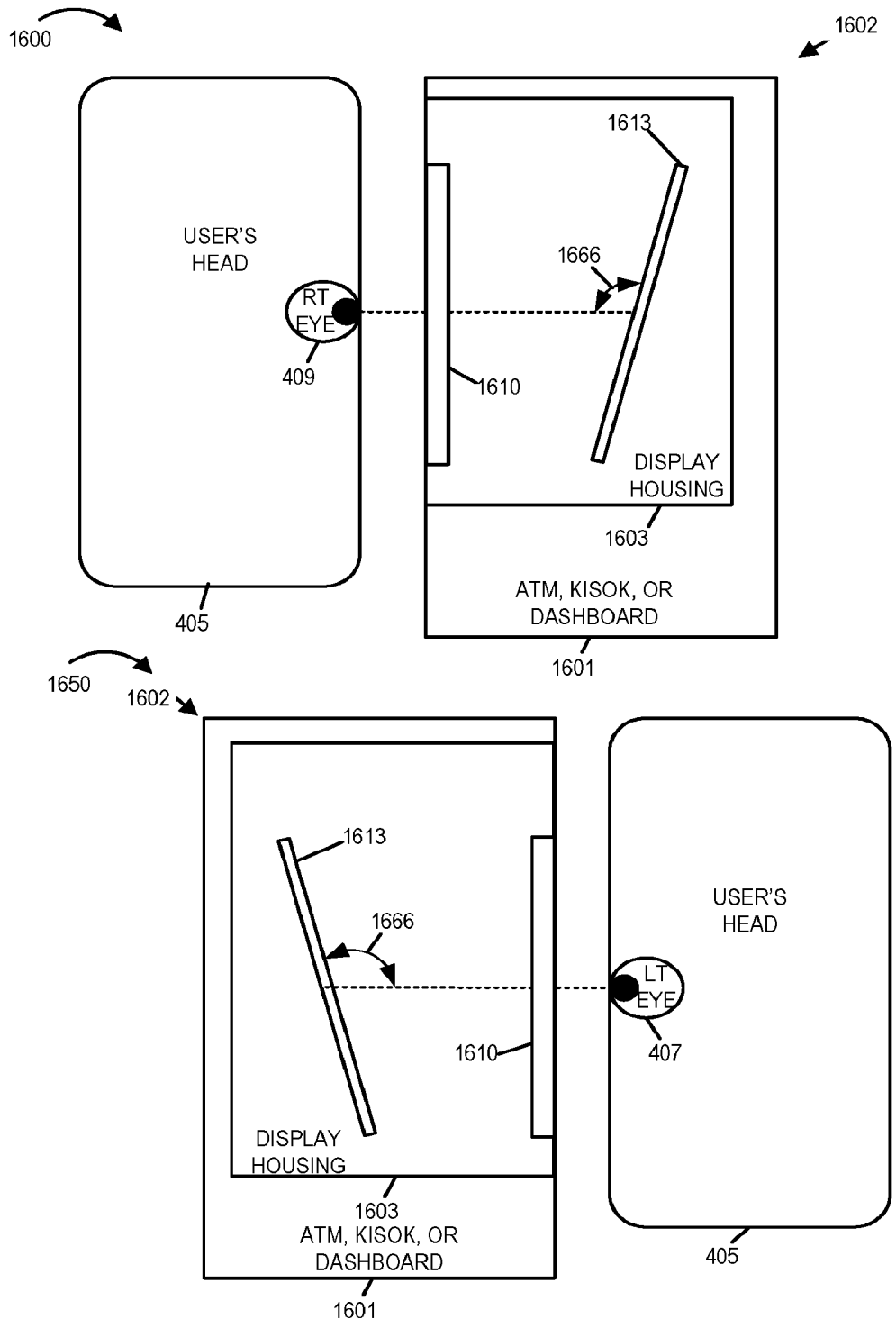
FIG. 16 is a drawing of an exemplary device, e.g., ATM, Kisok, or dashboard, including a tilted display in accordance with an exemplary embodiment of the invention.

FIG. 16 includes drawings (1602, 1650) including an exemplary system 1602 including an exemplary device 1601, e.g., ATM, Kisok, or dashboard, including a tilted display 1613 in accordance with an exemplary embodiment. Device 1601 includes a display housing 1603, including a viewing window 1610, e.g., a viewing surface through which display 1613 can be viewed, and a tilted display 1613, which is tilted at a non 90 degree angle 1666 with respect to the straight ahead view from the user's eyes (407, 409) of the viewer's head 405. In various embodiments, the viewing surface 1610 is a glass or plastic surface through which display 1610 can be viewed. FIG. 16 illustrates an exemplary device 1601 including a tilted display 1613, which is tilted at a non 90 degree angle allowing for a higher perceived resolution than if a display was mounted untilted where the angle was 90 degrees, given the same viewing window size. In some embodiments, display 1613 is rotated about a vertical axis rather than tilted.

Figure 17:
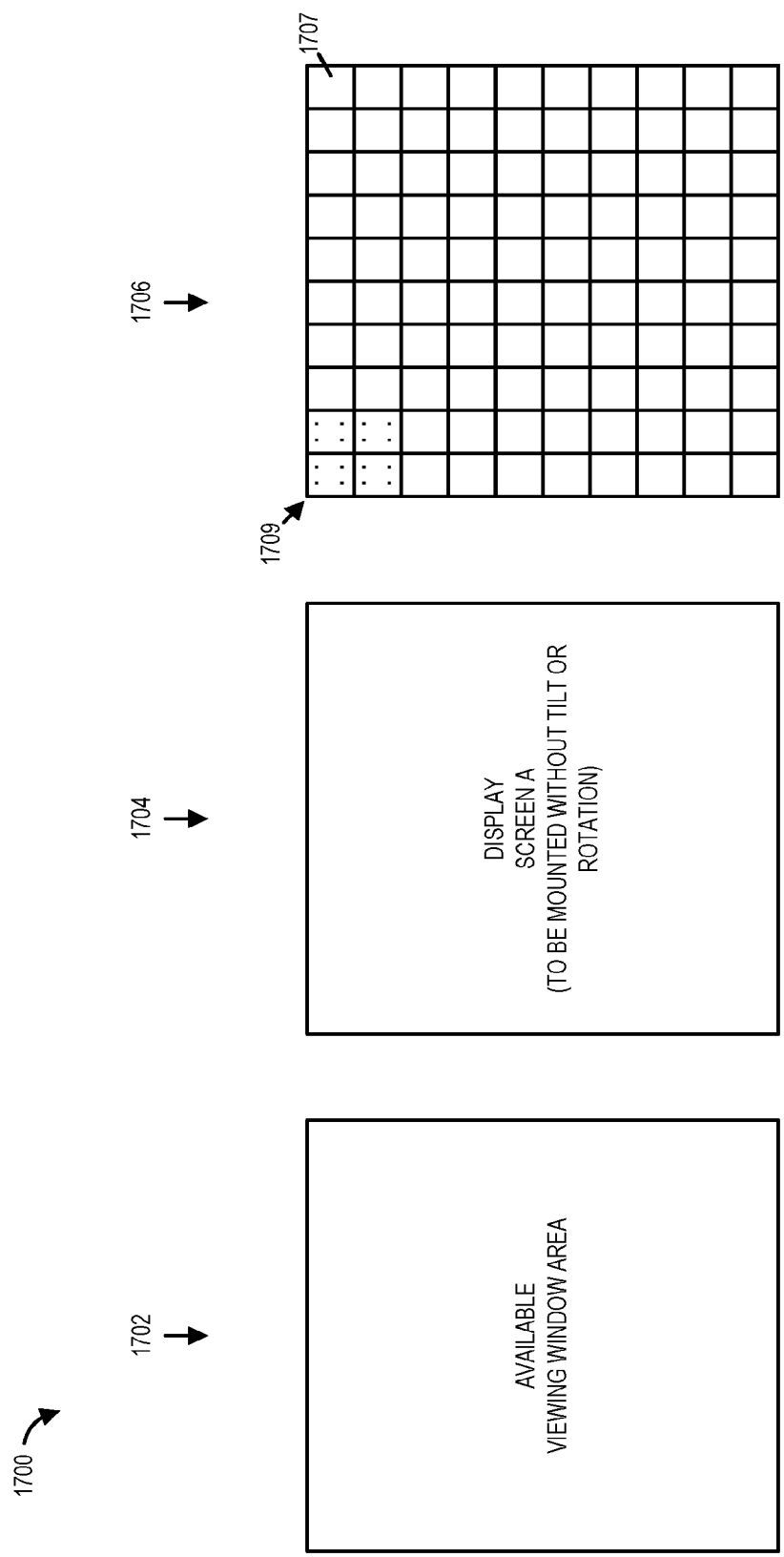
FIG. 17 is a drawing illustrating an available viewing window area, a display screen intended to be mounted without tilt, and exemplary display screen portions for an example in which the viewer views the screen straight on, e.g., as in FIG. 4.

FIG. 17 is a drawing 1700 illustrating an available viewing window area 1702, an exemplary display screen A 1704 intended to be mounted without tilt as in FIG. 4. Drawing 1700 further includes drawing 1706 illustrating an example in which display screen A 1704 has been subdivided into portions 1707. Each portion 1707 corresponds to a predetermined number of light emitting elements. In this example display 1704 has been subdivided into 100 portions 1707. Four dots are shown in each of the four display portions of the upper left area 1709 to illustrate an example of four exemplary light emitting elements per unit 1707. It should be appreciated that each unit 1707 in screen 1704 has the same number of light emitting elements.

Figure 18:
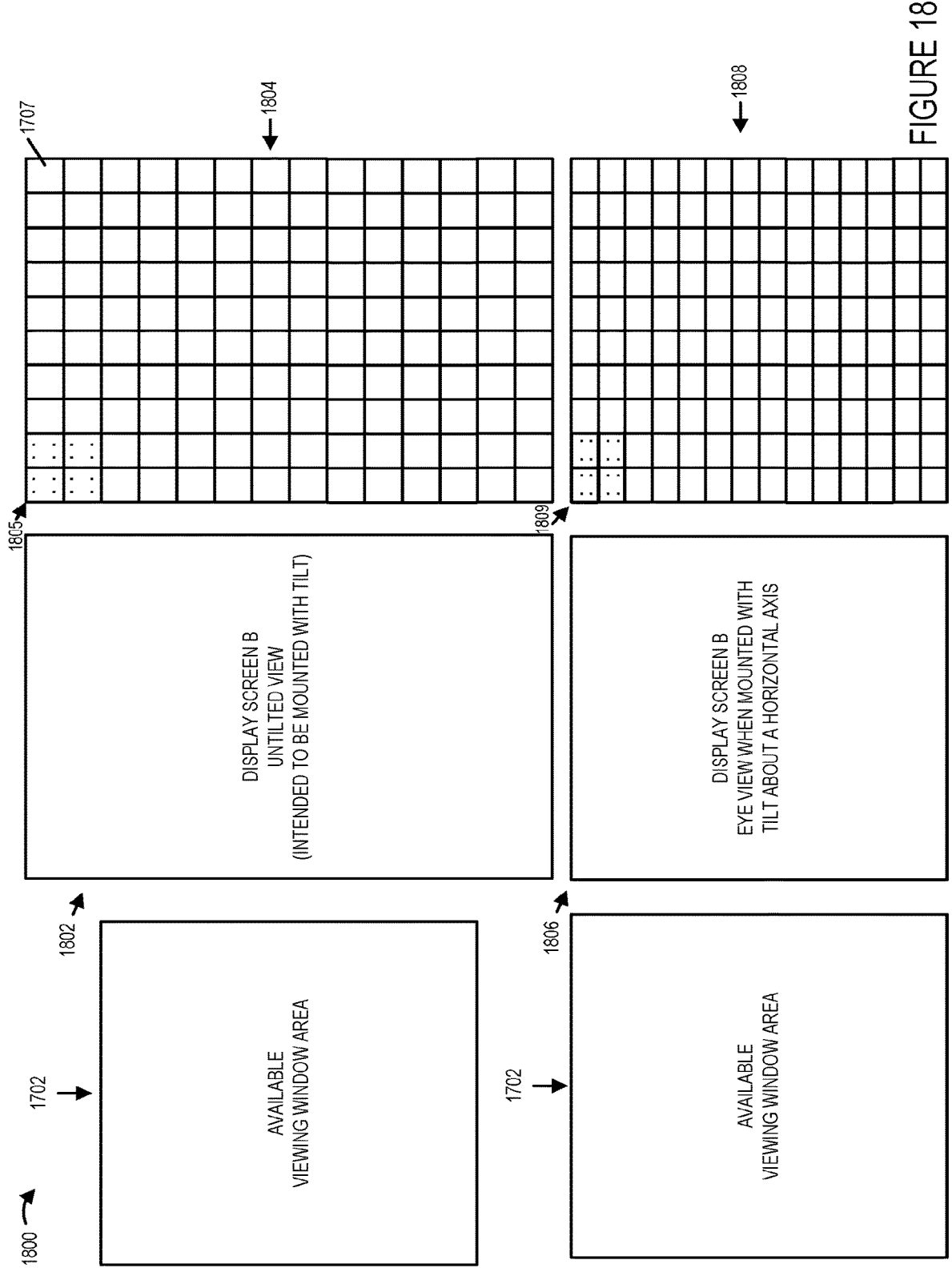
FIG. 18 is a drawing illustrating an available viewing window area, an exemplary display screen which is larger than the viewing window area, the display to be mounted with tilt about a horizontal axis in accordance with an exemplary embodiment of the invention, e.g., as in FIG. 7, 13, 14, 15, or 16.

FIG. 18 is a drawing 1800 illustrating available viewing window area 1702, an exemplary display screen B 1802, which is larger than the viewing window area 1702 and is larger than display screen A 1704, the display B 1802 is intended to be mounted with tilt about a horizontal axis, e.g., as in FIG. 7, 13, 14, 15, or 16, in accordance with an exemplary embodiment of the present invention. Drawing 1804 shows display screen B divided into portions 1707. Each portion 1707 corresponds to a predetermined number of light emitting elements. In this example display 1802 has been subdivided into 140 portions 1707. Four dots are shown in each of the four display portions of the upper left area 1805 to illustrate an example of four exemplary light emitting elements per unit 1707. It should be appreciated that each unit 1707 in screen 1802 has the same number of light emitting elements.

Drawing 1800 further includes drawing 1806 which illustrates a display screen B eye view when mounted with a tilt about a horizontal axis in accordance with a feature of some embodiments of the present invention, and drawing 1808 which illustrates the subdivided display B 1802 user eye view when mounted with the tilt about the horizontal axis. Four dots are shown in each of the four display portions of the upper left area 1809 to illustrate an example of four exemplary light emitting elements per unit 1707.

Consider that a received image was mapped to display screen A 1704 and displayed to a user by display screen A, which is mounted without tilt or rotation. Consider that the same received image was transformed, e.g. scaled, said scaling altering the aspect ratio, and mapped to larger display screen B 1802, which is intentionally mounted with tilt in accordance with the present invention, and displayed to a user. When viewing 1808 the user will see a higher perceived resolution than when viewing 1706 since more displayed pixels will be observed per unit area of eye surface when viewing 1808 than will be viewed by the eyes when viewing 1706.

Figure 19:
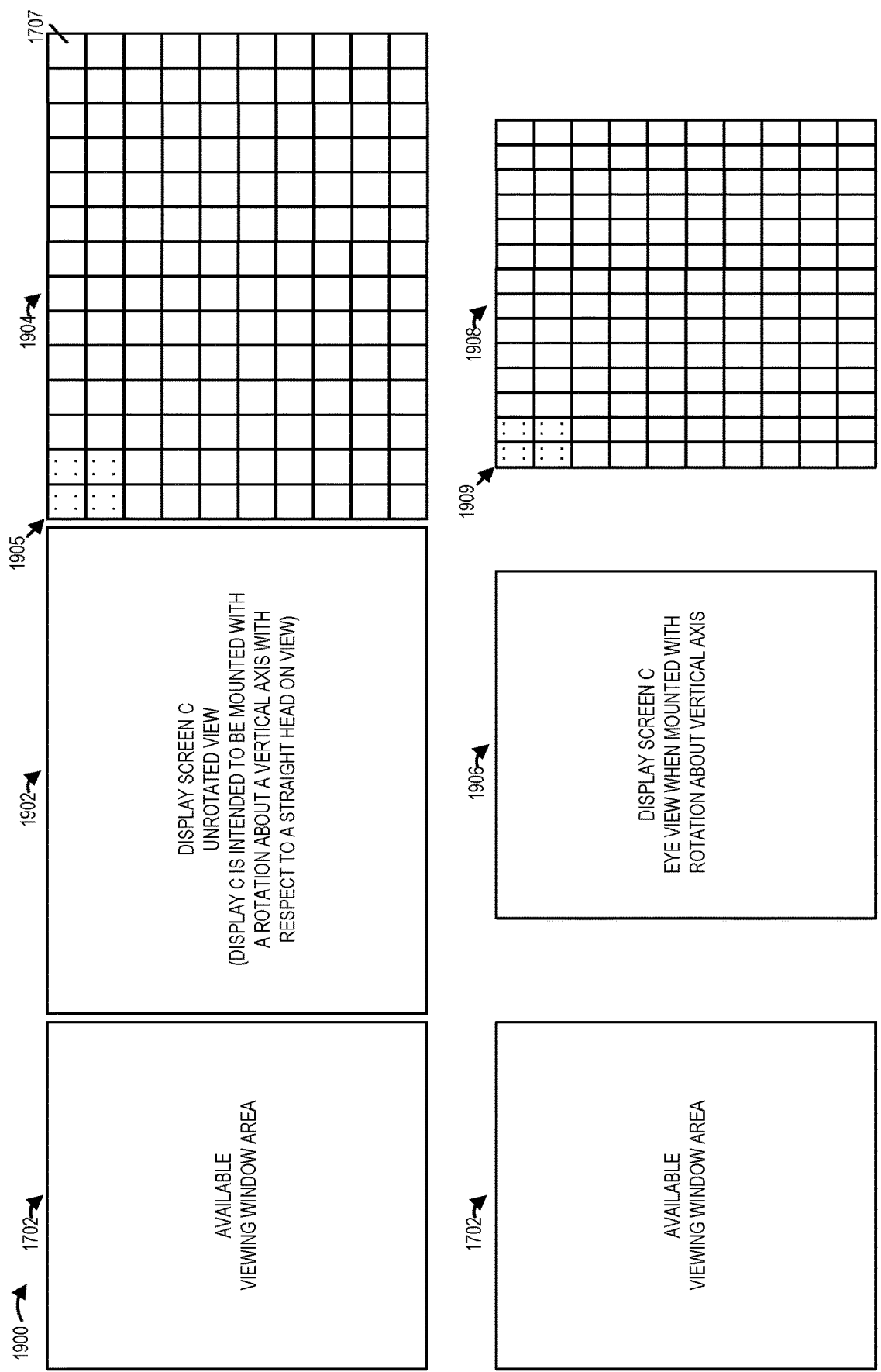
FIG. 19 is a drawing illustrating an available viewing window area, an exemplary display screen which is larger than the viewing window area, the display to be mounted with a rotation about a vertical axis in accordance with an exemplary embodiment of the invention, e.g., as in FIG. 5 or FIG. 6.

FIG. 19 is a drawing 1900 illustrating an available viewing window area 1702, an exemplary display screen C 1902 which is larger than the viewing window area A 1702, the display C 1902 to be mounted with a rotation about a vertical axis in accordance with an exemplary embodiment, e.g., as in FIG. 5 or FIG. 6. Drawing 1900 further includes drawing 1904 which shows display screen C 1902 divided into portions 1707. Each portion 1707 corresponds to a predetermined number of light emitting elements. In this example display 1904 has been subdivided into 140 portions 1707. Four dots are shown in each of the four display portions of the upper left area 1905 to illustrate an example of four exemplary light emitting elements per unit 1707. It should be appreciated that each unit 1707 in screen 1902 has the same number of light emitting elements.

Drawing 1900 further includes drawing 1906 which illustrates a display screen C eye view when mounted with a rotation about a vertical axis, and drawing 1908 which illustrates the subdivided display C eye view when mounted with the rotation about the vertical axis. Four dots are shown in each of the four display portions of the upper left area 1909 to illustrate an example of four exemplary light emitting elements per unit 1707.

Consider that a received image was mapped to display screen A 1704 and displayed to a user by display screen A, which is mounted without tilt or rotation. Consider that the same received image was transformed, e.g. scaled, said scaling altering the aspect ratio, and mapped to larger display screen C 1902, which is intentionally mounted with rotation about a vertical axis in accordance with the present invention, and displayed to a user. When viewing 1908 the user will see a higher perceived resolution than when viewing 1706 since more displayed pixels will be observed per unit area of eye surface when viewing 1908 than will be viewed by the eyes when viewing 1706.

It should be appreciated that in some embodiments, there are 2 screen B displays 1802, one being a right eye display and the other being a left eye display. It should be appreciated that in some embodiments, there are 2 screen C displays 1902, one being a right eye display and the other being a left eye display.

While the display mounting methods are well suited for use in head mounted display systems, e.g., as shown and described with respect to FIGS. 2, 5, 6, 7, 8, 9, 10, 13, 14 and 15, they are also useable on devices where the display can be mounted at an angle relative to the user, e.g., as shown in FIG. 16. For example in ATM machines, notebook computers and/or other systems. While the mounting of the display or displays at an angle may require more depth than a normal flat mounting, in many applications the thinness of a device is not critical, and the improved perceived improved quality in the viewed image can merit use of the described screen mounting arrangement in a wide variety of applications.

Figure 11:
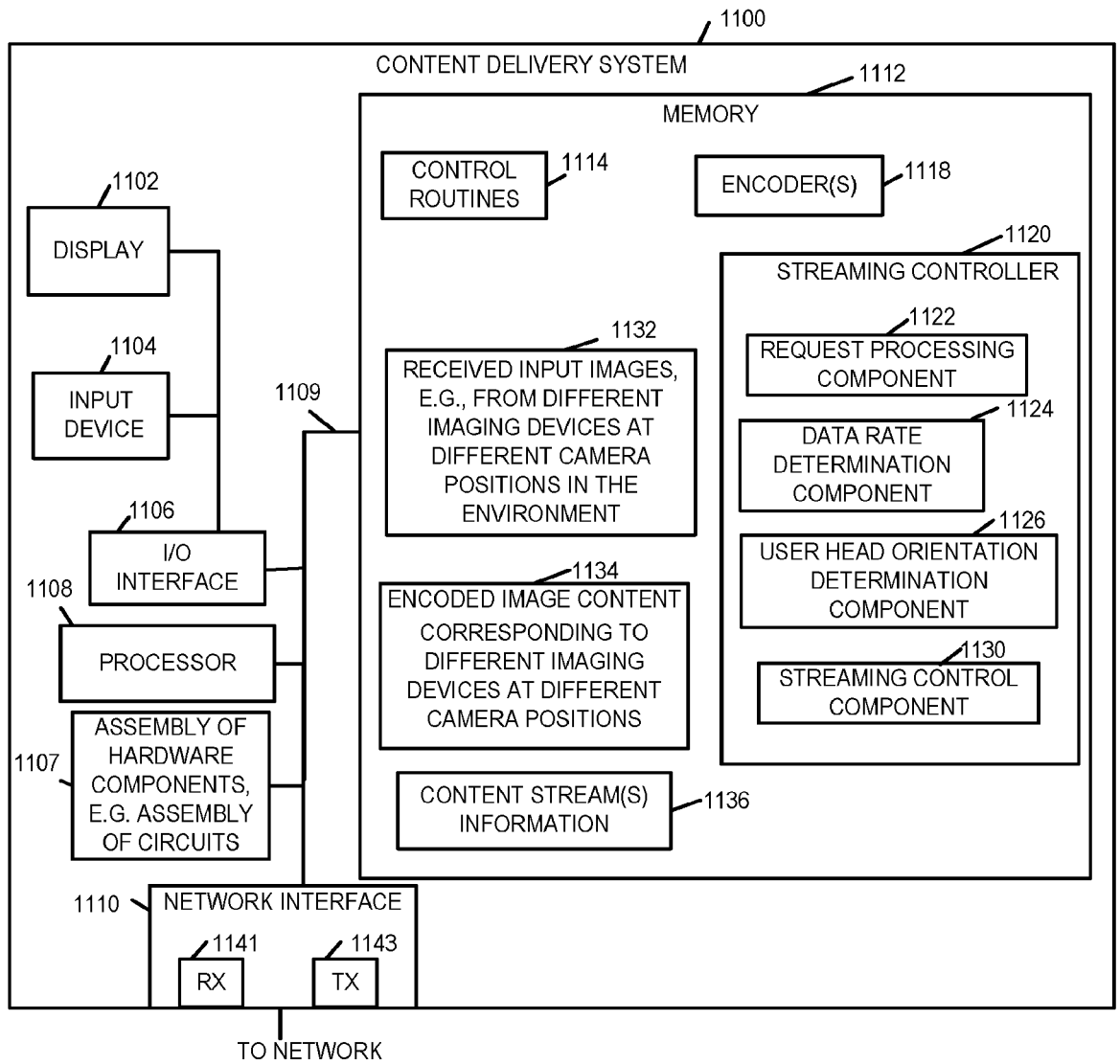
FIG. 11 illustrates an exemplary content delivery system that can be used to encode and stream content in accordance with the features of the invention.

FIG. 11 illustrates an exemplary content delivery system that can be used to encode and stream content in accordance with the features of the invention. The system may be used to perform encoding, storage, and transmission and/or content output in accordance with the features of the invention. The content delivery system 1100 may be used as the system 104 of FIG. 1. While the system shown in FIG. 11 is used for encoding, processing and streaming of content, it should be appreciated that the system 1100 may also include the ability to decode and display the received, processed and/or encoded image data, e.g., to an operator.

The system 1100 includes a display 1102, input device 1104, input/output (I/O) interface 1106, an assembly of hardware components, e.g. an assembly of circuits 1107, a processor 1108, network interface 1110 and a memory 1112. The various components of the system 1100 are coupled together via bus 1109 which allows for data to be communicated between the components of the system 1100. The system 1100 in some embodiments receives imaging content 1132 captured by the imaging devices at various different camera positions in the environment via the network interface 1110 and/or the I/O interface 1106. In some embodiments the system 1100 processes and encodes the received imaging data 1132 prior to delivering the content, e.g., over communications network 105, to customer rendering and playback systems such as systems 122, 124. Via the display 1102 the system 1100 can display the received, processed and/or encoded image data, e.g., to an operator. Via the input device 1104, which may be a keyboard, touch sensitive screen or another such input interface, an operator can provide input to the system 1100, e.g., to provide one or more input parameters and/or commands. Via the network interface 1110 (which includes a receiver 1141 and transmitter 1143) the system 1100 communicates (receives and/or transmits information) with external devices over the communications network 105. In some embodiments the system 1100 delivers encoded imaging content, acquired from one or more camera devices which captured the imaging content, to customer rendering and playback systems such as systems 122, 124, e.g., over communications network 105.

The memory 1112 includes various components, e.g., routines, which when executed by the processor 1108 control the computer system 1100 to implement image, e.g., video, acquisition, encoding, storage, and transmission and/or output operations in accordance with the invention. The memory 1112 includes control routines 1114, encoder(s) 1118, a streaming controller 1120, received input images 1132, e.g., stereoscopic or normal video of a scene, encoded image data 1134, and content stream(s) information 1136. In some embodiments the components are, implemented as software modules. In other embodiments the components are implemented in hardware, e.g., as individual circuits with each component being implemented as a circuit for performing the function to which the component corresponds. In still other embodiments the components are implemented using a combination of software and hardware.

The encoder(s) 1118 may, and in some embodiments do, include a plurality of encoders configured to encode received image content, e.g., a scene and/or one or more scene portions. In some embodiments encoder(s) include multiple encoders with each encoder being configured to encode a scene and/or partitioned scene portions to support a given bit rate stream. The scene may be a stereoscopic scene. Thus in some embodiments each scene portion can be encoded using multiple encoders to support multiple different bit rate streams for each scene. An output of the encoder(s) 1118 is the encoded image content 1134 which are stored in the memory for streaming to customer devices, e.g., rendering and playback devices. The encoded content can be streamed to one or multiple different devices via the network interface 1110.

The streaming controller 1120 is configured to control streaming of encoded content for delivering the encoded image content 1134 to one or more customer devices, e.g., over the communications network 105. The streaming controller 1120 includes a request processing component 1122, a data rate determination component 1124, a user head orientation determination component 1126, and a streaming control component 1130. The request processing component 1122 is configured to process a received request for imaging content from a customer rendering and playback system. The request for content is received in various embodiments via a receiver in the network interface 1110. In some embodiments the request for content includes information indicating the identity of requesting rendering and playback system. In some embodiments the request for content may include data rate supported by the customer playback device, a current head orientation of the user, e.g., orientation of the head mounted display. The request processing component 1122 processes the received request and provides retrieved information to other elements of the streaming controller 1120 to take further actions. While the request for content may include data rate information and current head position information, in various embodiments the data rate supported by the playback device can be determined from network tests and other network information exchange between the system 1100 and the playback and rendering systems. While in some embodiments some customer rendering and playback systems may request content streams based on determined head orientation of the user at the given time, e.g., to allow the user to view the environment from the perspective of a desired camera position in the environment, in many cases the customer rendering and playback systems may not specifically request a content stream but rather simply attach to a broadcast content stream among a plurality of content streams broadcast by the content delivery system 1100. In some embodiments the content delivery system 1100 broadcasts different content streams corresponding to different available camera positions in an environment in accordance with the invention. The content delivery system 1100 provides content stream information 1136 to the customer rendering and playback systems providing information regarding a plurality of content streams that may be available for receiving and use in playback and indicating information needed to tune to the broadcast content streams. The content stream information 1136 also indicates which content stream communicates and corresponds to which camera position in the environment to allow the customer rendering and playback systems to select and receive the appropriate content stream. The customer systems may also use the stream information 1136 to request a particular content stream corresponding to a user selected camera position at a given time in accordance with the invention.

The data rate determination component 1124 is configured to determine the available data rates that can be used to stream imaging content to customer devices, e.g., since multiple encoded scene portions are supported, the content delivery system 1100 can support streaming content at multiple data rates to the customer device. The data rate determination component 1124 is further configured to determine the data rate supported by a playback device requesting content from system 1100. In some embodiments the data rate determination component 1124 is configured to determine available data rate for delivery of image content based on network measurements.

The user head orientation determination component 1126 is configured to determine a current viewing angle and/or a current head orientation of the user, e.g., orientation of the head mounted display, from information received from the customer rendering and playback system. The streaming control component 1130 is configured to control streaming of image content at various supported data rates in some embodiments.

Figure 12:
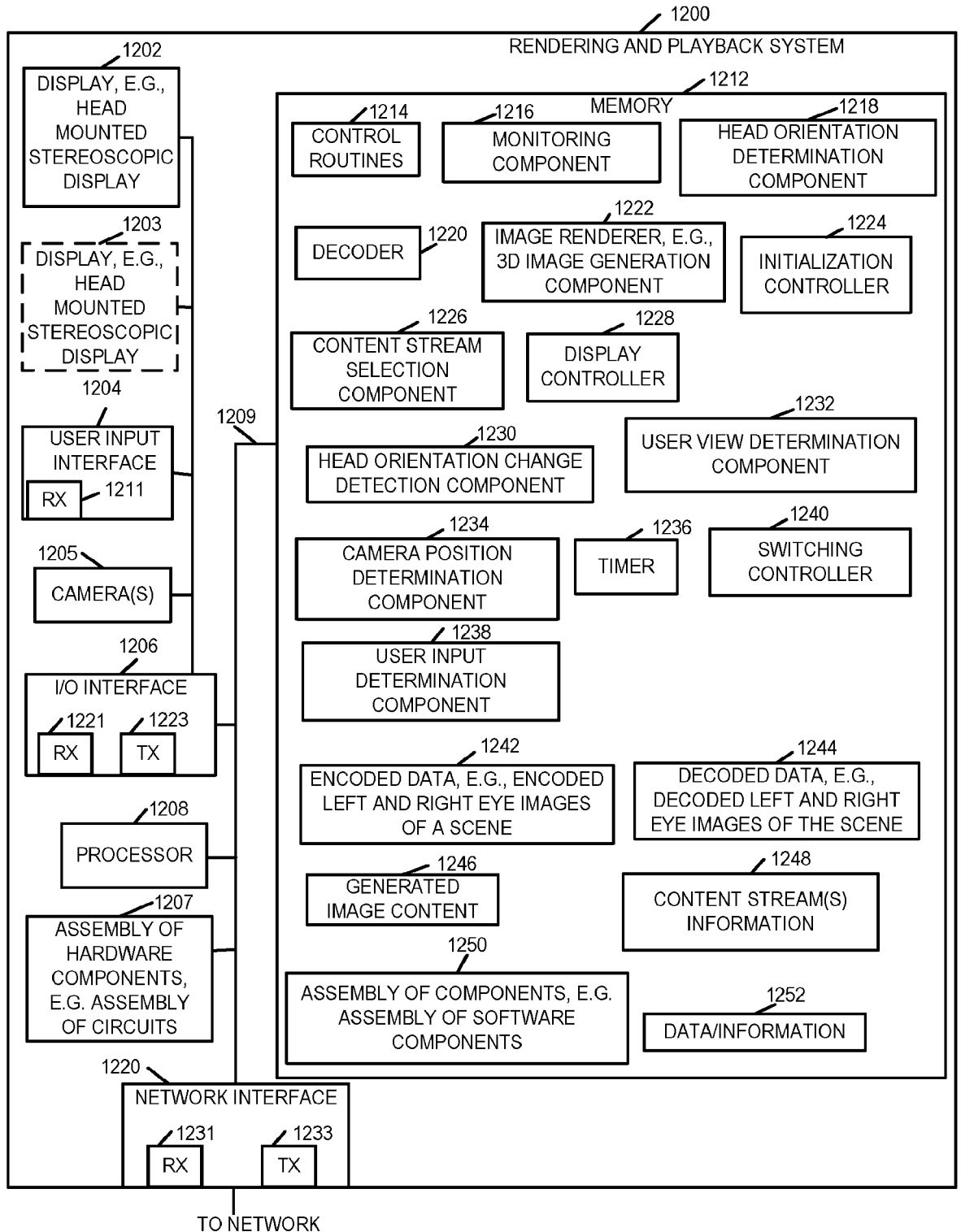
FIG. 12 illustrates an exemplary rendering and playback system, in accordance with exemplary embodiments of the invention, that can be used to receive, decode, transform, and display the content streamed by the system of FIG. 11.

FIG. 12 illustrates an exemplary rendering and playback system 1200 that can be used to receive, decode and display the content streamed by the content streaming system of FIGS. 1 and 11. The exemplary rendering and playback system 1200 may be used as any of the rendering and playback systems shown in FIG. 1-3, 5-10, or 13-16. The rendering and playback system 1200, in some embodiments, includes and/or is coupled to a 3D head mounted display. The system 1200 includes the ability to decode the received encoded image data and generate 3D image content for display to the customer. The rendering and playback system 1200 in some embodiments is located at a customer premise location such as a home or office but may be located at an image capture site as well. The rendering and playback system 1200 can perform signal reception, decoding, viewing position and/or content presentation control, display and/or other operations in accordance with the invention.

The exemplary rendering and playback system 1200 can receive, decode, store and display imaging content, e.g., in a simulated environment, to a user of the system 1200. The exemplary rendering and playback system 1200 may be used as the rendering and playback systems 122, 124, 200 and 300 shown in FIGS. 1-3, 5-10, and 13-16. The system 1200 includes the ability to decode received encoded image data, e.g., left and right eye images and/or mono (single images) captured by imaging apparatus located at various different camera positions in an environment from where content is being captured and generate image content for display to a user in accordance with the features of the invention.

The rendering and playback system 1200 includes a display 1202, e.g., a head mounted stereoscopic display, input interface 1204, one or more cameras 1205, input/output (I/O) interface 1206, an assembly of hardware components, e.g. an assembly of circuits 1207, a processor 1208, network interface 1210 and a memory 1212. In some embodiments, the rendering and playback system 1200 includes a second display 1203, e.g., a head mounted stereoscopic display. In some embodiments, a first one of the displays, e.g., display 1202, is used to display left eye images, and a second one of the displays, e.g., display 1204 is used to display left eye images. In some embodiments, first and second displays 1202, 1203 are mounted in a headmounted stereoscopic display assembly. In some embodiments, the display 1202 or displays 1202, 1203 are intentionally mounted in tilted or rotated positions, e.g., so the viewer does not look directly straight on at the screen or screens. In some embodiments, each of the displays 1202, 1203 includes multiple screen portions, e.g., as shown in FIGS. 8-10, which are each mounted tilt or rotation angles. The various components of the system 1200 are coupled together via bus 1209 which allows for data to be communicated between the components of the system 1200 and/or by other connections or through a wireless interface. The rendering and playback system 1200 includes the head mounted 3D display 1202, and in some embodiments additional display 1203, on which the image content is presented, e.g., with left and right eyes of a user being presented with different images in the case of stereoscopic content. By displaying different images to the left and right eyes on a single screen, e.g., on different portions of the single screen to different eyes, a single display can be used to display left and right eye images which will be perceived separately by the viewers left and right eyes. In some embodiments 2 distinct display screens 1202, 1203 are used corresponding to different eyes. In some embodiments the playback and rendering system 1200 is used as the playback and rendering system 200 and a cell phone/Smartphone screen is used as the display 1202. In some other embodiments the playback and rendering system 1200 is used as the playback and rendering system 300. The head mounted display 1202 maybe implemented using the OCULUS RIFT™ VR (virtual reality) headset which may include the head mounted display 1202. Other head mounted displays may also be used. In a case where a cell phone, e.g., Smartphone, processor is used as the processor 1208 and the cell phone generates and displays images in a head mount assembly (such as head mount 102), the system 1200 may include as part of the head mount device the processor 1208, display 1202, camera(s) 1205 and memory 1212. The processor 1208, display 1202 and memory 1212 may all be part of the cell phone. In other embodiments of the system 1200, the processor 1208 may be part of a gaming system such as an XBOX, PS3, PS4 etc., with the display 1202 being mounted in a head mounting device and coupled to the gaming system. Whether the processor 1208 or memory 1212 are located in the device which is worn on the head or not is not critical and, as can be appreciated, while in some cases it may be convenient to collocate the processor in the headgear, from a power, heat and weight perspective it can be desirable to in at least some cases to have the processor 1208 and memory coupled to the head gear which includes the display. While various embodiments contemplate a head mounted display 1202, the methods and system can also be used with non-head mounted displays which can support 3D image.

The operator/user of the playback and rendering system 1200 may control one or more parameters, input information, commands etc., via the user input interface 1204 and/or select operations to be performed, e.g., select to display simulated environment including scene content. Via the user input interface 1204 a user provides input to the rendering and playback system 1200, e.g., input indicating a user selected switch from a first camera position to another camera position. The user input interface may include, for example, a keyboard, keypad, touchpad and/or touch sensitive screen. The user input interface 1204 includes a receiver 1211 via which the rendering and playback system 1200 receives the information/data provided by the user. The user may use the user input interface 1204 to make a selection of item and/or respond to a displayed prompt and/or other indication requiring user's input. For example user can provide input selecting a different camera position than a currently selected camera position from which the user is viewing the environment. The user input may be provided e.g., by a single tap, double tap or some other action on the input interface 1204.

The camera(s) 1205 includes one or more cameras which can be, and sometimes are, used to capture images, e.g., of persons, physical environment and/or objects in the physical environment where the system 1200 is located. In some embodiments where the system 1200 is used as the rendering and playback 200 the camera 1205 may be the camera device of the Smartphone being used in the system 200. In some embodiments where the system 1200 is used as the rendering and playback system 300 the camera 1205 may be the camera located on the rendering device 302 or on the head mounted display 304.

Via the I/O interface 1206, the system 1200 can be coupled to external devices to exchange signals and/or information with other devices. In some embodiments via the I/O interface 1206 the system 1200 can receive information and/or images captured by external cameras and output information and/or images to external devices. The I/O interface 1206 includes a receiver (RX) 1221 and a transmitter (TX) 1223 via which the receiving and transmitting operations are performed. In some embodiments via the interface 1206 the system 1200 is coupled to an external controller, e.g., such as the handheld controller 306. In embodiments where a handheld controller 306 is available, the handheld controller 306 may be coupled to the I/O interface 1206 and used to enter information and/or provide user input, e.g., selecting a camera position from which the user would like to experience the environment, to the system via the I/O interface 1206.

The processor 1208, e.g., a CPU, executes routines 1214 and uses the various components to control the system 1200 to operate in accordance with the invention. The processor 1208 is responsible for controlling the overall general operation of the system 1200. In various embodiments the processor 1208 is configured to perform functions that have been discussed as being performed by the playback and rendering system 1200.

Via the network interface 1220 the system 1200 communicates and/or receives signals and/or information (e.g., including images and/or video content corresponding to a scene) to/from various external devices over a communications network, e.g., such as communications network 105. The network interface 1220 includes a receiver 1231 and a transmitter 1233 via which the receiving and transmitting operations are performed. In some embodiments the system receives one or more content streams via the network interface 1220 from the content delivery system 104. In some embodiments the system 1200 receives, via the receiver 1231 of interface 1220, one or more content streams communicating content captured by one or more camera devices located at different camera positions in an environment to use for playback, e.g., stream communicating content corresponding to a scene of an event, e.g., soccer game. The received content stream may be received as encoded data, e.g., encoded scene data 1242.

In some embodiments the memory 1212 includes various routines and/or components which when executed by the processor 1208 control the rendering and playback system 1200 to perform operations in accordance with the invention. The memory 1212 includes control routines 1214, a monitoring component 1216, a head orientation and/or viewing angle determination component 1218, a decoder 1220, an image renderer 1222, an initialization controller 1224, a content stream selection component 1226, a display controller 1228, a head orientation change detection component 1230, a determination component 1232, a camera position determination component 1234, a timer 1236, user input determination component 1238, and a switching controller 1240. The memory 1212 further includes data/information including encoded data 1242, decoded data 1244 and generated image content 1246.

The control routines 1214 include device control routines and communications routines to control the operation of the system 1200. The monitoring component 1216 is configured to monitor for user input, commands, instructions provided by the user via, e.g., the user input interface 1204 and/or I/O interface 1206. In some embodiments the monitoring component 1216 monitors for user control inputs for controlling the rendering and playback system 1200, e.g., control zooming to a displayed area, controlling volume and/or other features.

The head orientation and/or viewing angle determination component 1218 is configured to determine a current head orientation of the user, e.g., orientation of the head mounted display. The head orientation determination component 1218 may be implemented using one or a combination of sensors to detect user's head orientation at a given time. In some embodiments the determined head orientation and/or change in orientation from a reference orientation is used in determining which of a plurality of camera position the user is viewing at a given time.

The decoder 1220 is configured to decode encoded image content 1242, e.g., encoded content communicated in a content stream received from a content delivery system to produce decoded image data 1244. The decoded image data 1244 may include decoded images captured by imaging devices located at various camera positions in an environment where the images are captures. The image renderer 1222 uses decoded image data including content corresponding to a scene to generate content for displaying to a user on the display 1202. The generated imaging content 1246 which is displayed to a user is the output of the image renderer 1222. The image renderer 1222 may be implemented as a 3D image generation component to render 3D stereoscopic image content.

The initialization component 1224 is configured to set the detected current head orientation as a default/reference head orientation, e.g., 0 degree head rotation and head tilt angles, during the system operation initialization phase. The initialization component 1224 is further configured to initialize a current viewing position by setting the current viewing position to correspond to a first camera position, e.g., a default camera position (predetermined) or a last used camera position. During content display a current viewing position corresponds to a currently selected camera position from where the user will experience the content in the displayed simulated environment.

The content stream selection component 1226 is configured to select a content stream communicating content captured by an imaging device at the selected camera position, e.g., camera position selected by the initialization component 1224 during initialization and/or selected by the user. In various embodiments the content stream selection component 1226 uses the content stream information 1248 to decide which stream(s) to select for use in display. Depending on a camera position selected at a given time the content stream selection component 1226 selects a corresponding content stream accordingly. The display controller 1228 is configured to control displaying of a simulated environment including content corresponding to a user selected camera position in the environment to the user on the display device 1202. The display controller 1228 is configured to control presentation, e.g., display, of content corresponding to the selected camera position in the environment, e.g., on the head mounted display 1202. Thus during initialization the display controller 1228 controls presentation of content corresponding to a first camera position, e.g., default or last used camera position, e.g., with the user being presented content from the perspective of the first camera position which has been chosen as the default camera position during initialization. At another time the display controller 1228 may control presentation of content corresponding to another user selected camera position in the environment.

The head orientation change detection component 1230 is configured to monitor the user's current head orientation to detect changes in the head orientation, e.g., due to rotation of head, tilting of the head or both rotation and tilting, from an initial/current head orientation. In some embodiments the head orientation change detection component 1230 monitors for changes in the head orientation following the initial detection of user's head orientation and setting of the default/reference head orientation. The head orientation change detection component 1230 is configured to detect changes in the head orientation relative to a currently set head orientation at a given time, e.g., default/reference head orientation initially detected by the head orientation determination component 1218. Thus if the user's head orientation changes from the initially detected head orientation, e.g., due to head rotation, tilt or both, the head orientation change detection component 1230 receives an input from the head orientation determination component 1218 indicating a current head orientation and compares it against the currently set/previously detected head orientation of the user stored in memory 1212 to determine if there has been any changes in the head orientation. In some embodiments the head orientation change detection component 1230 is further configured to determine the head angle of rotation and/or head tilt angle relative to the default head orientation, e.g., how much has the user rotated and/or tilted his/her head from the 0° position corresponding to the default/reference head orientation or an angle corresponding to the previously detected head orientation. In various embodiments such head angle of rotation and/or head tilt angle information is used to determine if the user has been viewing another camera position in the environment.

The determination component 1232 is configured to determine if the user is viewing another camera position in the environment at a given time. In some embodiments the determination component 1232 is configured to determine if the user is viewing another camera position in the environment from i) head angle of rotation, ii) head tilt angle or iii) both the user head angle of rotation and user head tilt angle. In various embodiments the determination component 1232 receives the information indicating the changes in head orientation, e.g., head angle of rotation and/or head tilt angle from the head orientation change detection component 1230 and uses this information to make a determination whether the user is viewing another camera position in the environment. In some embodiments the determination component 1232 includes the head orientation change detection component 1230. In various embodiments when it is determined that the user has been viewing the another camera position the monitoring component 1216 monitors for monitors, while the user of the system 1200 is viewing the another camera position in the environment, to detect user input indicating a user selected switch to the another camera position. In some embodiments the monitoring component 1216 monitors for user input on a control input interface (e.g., such as the user interface 1204) while the user is viewing the another camera position.

The camera position determination component 1234 is configured to determine which of a plurality of alternative camera positions the user is viewing based on at least one of the user head angle of rotation or the head tilt angle. The timer 1236 is configured to determine if the user has been viewing the another camera position for a predetermined time. In some embodiments the timer 1234 monitors the time elapsed since the user has been determined to be viewing the other camera position and detect if the elapsed time equals or exceeds the predetermined time. In various embodiments when it is determined that the user has not been viewing the another camera position or was viewing the another camera position for less than the predetermined time, the display controller 1228 is configured to control the system to continue displaying, e.g., on the display 1202, content corresponding to the first camera position. In various embodiments when it is determined that the user has been viewing the another camera position for the predetermined time, the display controller 1228 is configured to control the system 1200 to present, e.g., display along with the content being presented, the user an indication that the user can switch to viewing the environment from a perspective of the another camera position. In some embodiments the display controller 1228 is configured, as part of presenting the user an indication that the user can switch to viewing the environment from a perspective of the another camera position, to provide a visual indication corresponding to the another camera position indicating that a switch to viewing the environment from the perspective of the another camera position is possible. In some embodiments the visual indication is one of at least a change in color or shading at said another camera position. In some embodiments the visual indication includes text in the area of said another camera position putting the user on notice of the potential to switch to viewing from the perspective of said another camera position.

The user input determination and processing component 1238 is configured to determine if the user input indicating a user selected switch to the another camera position has been detected, e.g., on the user input interface 1204 or other interface, within a predetermined time of the start of presenting the indication to the user, e.g., visual indication. The user input determination and processing component 1238, upon determining that a user input has been detected at a user interface, processes the user input information and/or commands/instructions and take action accordingly and/or provide the received input to another system element for further processing, action or storage in the memory 1212. In some embodiments when it is determined that the user input indicating a user selected switch to the another camera position has not been detected within the predetermined time from the start of presenting the indication the user input determination and processing component 1238 provides an instruction to the display controller 1228 to eliminate, e.g., exclude from being displayed, the indication that the user can switch to the another camera position. Accordingly the display controller 1228 controls the system 1200 to eliminate the indication indicating that the user can switch to the another camera position.

In various embodiments when it is determined that the user input indicating a user selected switch to the another camera position has been detected within the predetermined time the user input determination and processing component 1238 provides an instruction to the stream selection component 1226 to select a content stream corresponding to the another camera position. Thus when it is determined that the user input indicating a user selected switch to the another camera position has been detected within the predetermined time the stream selection component 1226 is configured to select a content stream communicating content captured by an imaging device located at the another, e.g., second, camera position in the environment.

The switching controller 1240 is configured to control the system 1200 to switch from displaying to the user content corresponding to the first camera position in the environment to displaying content corresponding to the another camera position in the environment when it is determined that the user input indicating a user selected switch to the another camera position has been detected within the predetermined time. In some such embodiments switching controller 1240 is configured to control the system to switch from receiving and displaying a first broadcast content stream corresponding to an output of a first imaging device, e.g., a first stereoscopic camera pair, located at the first camera position to receiving and displaying a second broadcast content stream corresponding to an output of a second imaging device, e.g., a second stereoscopic camera pair, located at said another camera position.

The content stream information 1248 includes information regarding a plurality of content streams that may be available for receiving and use in playback. In some embodiments the stream information 1248 is provided by the content provider's content delivery system 1100 (e.g., stream information 1136). In some embodiments the different available content streams correspond to different imaging devices located at different camera positions in the environment. In some embodiments the stream information 1248 includes, for a plurality of available content streams, one of a multicast address of a multicast group which can be joined to receive a given content stream corresponding to a given camera position, information which can be used to request access to a switched digital video channel used to provide a given content stream corresponding to a given camera position, or channel tuning information which can be used to control a tuner of the playback system 1200 to tune to a broadcast channel on which a given content stream corresponding to a given camera position is broadcast.

In some embodiments, the memory 1212 includes an assembly of components 1250, e.g., an assembly of software components, and data/information 1252.

In some embodiments the components and/or elements shown in the memory 1212 are implemented as software modules. In other embodiments the elements, while shown to be included in the memory 1212, are implemented in hardware, e.g., as individual circuits with each element being implemented as a circuit for performing the function corresponding to the element. In still other embodiments the components and/or elements are implemented using a combination of software and hardware.

While shown in FIG. 12 example to be included in the memory 1212, the elements shown included in the system 1200 can, and in some embodiments are, implemented fully in hardware within the processor 1208, e.g., as individual circuits. In other embodiments some of the elements are implemented, e.g., as circuits, within the processor 1208 with other elements being implemented, e.g., as circuits, external to and coupled to the processor 1208. As should be appreciated the level of integration of components on the processor and/or with some components being external to the processor may be one of design choice. Alternatively, rather than being implemented as circuits, all or some of the elements may be implemented in software and stored in the memory 1212 of the system 1200, with the software components controlling operation of the system 1200 to implement the functions corresponding to the components when the components are executed by a processor, e.g., processor 1208. In still other embodiments, various elements are implemented as a combination of hardware and software, e.g., with a circuit external to the processor 1108 providing input to the processor 1208 which then under software control operates to perform a portion of a component's function.

While shown in the FIG. 12 embodiment as a single processor, e.g., computer, it should be appreciated that the processor 1208 may be implemented as one or more processors, e.g., computers. When one or more elements in the memory 1212 are implemented as software components, the components include code, which when executed by the processor 1208, configure the processor 1208 to implement the function corresponding to the component. In embodiments where the various components shown in FIG. 12 are stored in the memory 1212, the memory 1212 is a computer program product comprising a computer readable medium comprising code, e.g., individual code for each component, for causing at least one computer, e.g., processor 1208, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIGS. 11 and 12 control and/or configure the systems 1100 and 1200 or elements therein respectively such as the processor 1108 and 1208 to perform the functions of corresponding steps of the methods of the present invention, e.g., such as those illustrated and/or described in the flowchart 1000.

An exemplary method of presenting content corresponding to an environment, in accordance with some embodiments comprises: displaying to a user content corresponding to a first camera position in said environment; determining if the user is viewing another camera position in said environment; and monitoring, while said user is viewing said another camera position, to detect user input indicating a user selected switch to said another camera position. In some embodiments the determining if the user is viewing another camera position in said environment includes determining from i) a user head angle of rotation, ii) user head tilt angle or iii) both the user head angle of rotation and user head tilt angle, if said user is viewing said another camera position.

In some embodiments the method further comprises: determining which of a plurality of alternative camera positions the user is viewing based on at least one of the user head angle of rotation or viewer head tilt angle. In some embodiments the method further comprises: when it is determined that the user is viewing another camera position in said environment, presenting the user an indication that the user can switch to viewing the environment from a perspective of said another camera position.

In some embodiments the presenting the user an indication that the user can switch to viewing the environment from a perspective of said another camera position includes providing a visual indication corresponding to the another camera position that a switch to viewing the environment from the perspective of said another camera position is possible. In some embodiments the visual indication is one of at least a change in color or shading at the another camera position. In some embodiments the visual indication includes text in the area of said another camera position putting the user on notice of the potential to switch to viewing from the perspective of said another camera position. In some embodiments the another camera position is one of a second, third or fourth camera position at a stadium. In some embodiments the environment is a stadium or area. In some embodiments the environment includes an audience seating area and a performance area said environment including at least two camera positions corresponding to different audience seating positions. In some embodiments the performance area is one of a field or a stage.

In some embodiments the method further comprises: in response to said monitoring detecting user input indicating a user selected switch to said another camera position switching from displaying to the user content corresponding to a first camera position in said environment to displaying to the user content corresponding to the another camera position in said environment.

In some embodiments switching from displaying to the user content corresponding to a first camera position in said environment includes switching from receiving and displaying a first broadcast content stream corresponding to an output of a first stereoscopic camera pair located at said first camera position to receiving and displaying a second broadcast content stream corresponding to an output of a second stereoscopic camera pair located at said another camera position.

In some embodiments the monitoring to detect user input indicating a user selected switch to said another camera position includes monitoring for user input on a control input interface (e.g., touch pad or touch screen) while said user is viewing said another camera position. In some embodiments the user input includes one or a double tap on the control input while the user is viewing the another camera position. In some embodiments determining if the user is viewing another camera position in said environment includes: monitoring a current head orientation of the user; and determining if the head orientation indicates (e.g., by the angle relative to the camera position of the current view) whether the user is viewing the another camera position.

In some embodiments the method further comprises: determining, prior to presenting the user an indication that the user can switch to viewing the environment from a perspective of said another camera position, if the user was viewing said another camera position for a predetermined time. In some embodiments presenting the user said indication is contingent on determining that the user was viewing said another camera position for the predetermined time.

In some embodiments the method further comprises: eliminating the indication that the user can switch to viewing the environment from a perspective of said another camera position if said monitoring, while said user is viewing said another camera position, fails to detect user input indicating a user selected switch to said another camera position within a predetermined time of the start of presenting the user the indication.

An exemplary interactive system, e.g., such as the rendering and playback system 1200, for presenting content corresponding to an environment, comprises: a display device; a display controller configured to control displaying, to a user on said display device, of content corresponding to a first camera position in said environment; a user view determination component configured to determine if the user is viewing another camera position in said environment; and a monitoring component configured to monitor, while said user is viewing said another camera position, to detect user input indicating a user selected switch to said another camera position.

In some embodiments the user view determination component is configured to determine from i) a user head angle of rotation, ii) user head tilt angle or iii) both the user head angle of rotation and user head tilt angle, if said user is viewing said another camera position. In some embodiments the system further comprises: a camera position determination component configured to determine which of a plurality of alternative camera positions the user is viewing based on at least one of said user head angle of rotation or user head tilt angle.

In some embodiments the system the display controller is further configured to control presenting, on said display device, of an indication to the user that the user can switch to viewing the environment from a perspective of said another camera position when it is determined that the user is viewing another camera position in said environment. In some embodiments the display controller is further configured to control presenting of a visual indication corresponding to the another camera position, on said display device, indicating that a switch to viewing the environment from the perspective of said another camera position is possible, as part of being configured to present the user an indication that the user can switch to viewing the environment from a perspective of said another camera position.

In some embodiments the system further comprises: a switch controller configured to control the system to switch from displaying, on said display device, content corresponding to a first camera position in said environment to displaying to the user content corresponding to the another camera position in said environment, in response to said monitoring component detecting user input indicating a user selected switch to said another camera position. In some embodiments the switch controller is further configured, as part of being configured to switch from displaying content corresponding to a first camera position to displaying content corresponding to said another camera position, to control the system to switch from receiving and displaying a first broadcast content stream corresponding to an output of a first stereoscopic camera pair located at said first camera position to receiving and displaying a second broadcast content stream corresponding to an output of a second stereoscopic camera pair located at said another camera position.

In some embodiments the system further comprises: a control input interface. In some embodiments the monitoring component is configured to monitor to detect user input indicating a user selected switch to said another camera position on said control input interface while said user is viewing said another camera position.

In some embodiments the user view determination component is further configured to: monitor the current head orientation of the user; and determine if the head orientation indicates whether the user is viewing the another camera position. In some embodiments the system further comprises: a timer configured to determine if the user was viewing said another camera position for a predetermined time. In some embodiments the display controller is configured to control presenting, on said display device, of said indication to the user that the user can switch to viewing the environment from a perspective of said another camera position contingent upon a determination by said timer that the user was viewing said another camera position for the predetermined time. In some embodiments the display controller is configured to eliminate the indication that the user can switch to viewing the environment from a perspective of said another camera position if said monitoring component fails to detect user input indicating a user selected switch to said another camera position within a predetermined time of the start of presenting the user the indication.

In various embodiments, to take advantage of the tilted screens, the images, e.g., left and right eye images to be displayed on corresponding portions of a display or displays are resized to occupy the area of the tilted screen. Since in many cases the screens are tilted in one direction and not both, the rescaling will result in a distortion of the aspect ratio of the original image. However, while the displayed image will be larger in the direction in which the screen is titled, the vertical or horizontal size of the viewing area when viewed head on will be the same as that which would have been viewed if the image were not distorted to occupy the area of the tilted screen with the perceived resolution in the dimension in which the screen is titled being higher than the dimension in which the screen is not angled relative to the user's eyes. For example if the screen is tilted vertically, the vertical view will have a higher perceived resolution, e.g., more dots per inch, than the horizontal dimension which will extend parallel to the user's face due to the larger numbers of light emitting elements per inch which are visible to the viewer in the vertical dimension. In the case where the left and right display areas of one or more screens are angled, e.g., not parallel to the users face, in the horizontal direction relative to a user's face, the horizontal dimension will have a higher resolution, e.g., dots per inch than the vertical direction, and the displayed image will be scaled to fully occupy the display but with the horizontal visible area being the same or similar to what would be viewed by a user if the screen(s) were parallel to the user's eyes.

The difference between the location of an object in the left and right eye images is interpreted as a distance from the user. With an angled display or displays, portions of the screen will be closer to a user than other portions. In some, but not all embodiments, the images to be displayed are processed to try and compensate for the effect on perceived object depth that the difference in screen distance may have. In some embodiments objects in images are identified and the difference in positions is increased or decreased as a function of the screen location on which the images are to be displayed. For example objects on a screen portion further away from a user's face, e.g., eyes, may be adjusted to decrease the difference in the objects position to make them seem closer to compensate for the fact they are being displayed on a display portion further away from another portion of the display closer to the user's face and eyes. Similarly objects to be displayed on a screen portion closer to a user's face, e.g., eyes, may be adjusted to increase the difference in the objects position between the left and right eyes to make them seem further away to compensate for the fact they are being displayed on a display portion closer to the user's face and eyes than another portion of the display used to display other objects. In this manner when displaying 3D image content parallax adjustments may be, and sometimes are, made to compensate for the difference in distance, of different portions of the display or displays due to the use of a tilted display or displays, from a user's face and/or eyes.

Figure 20B:
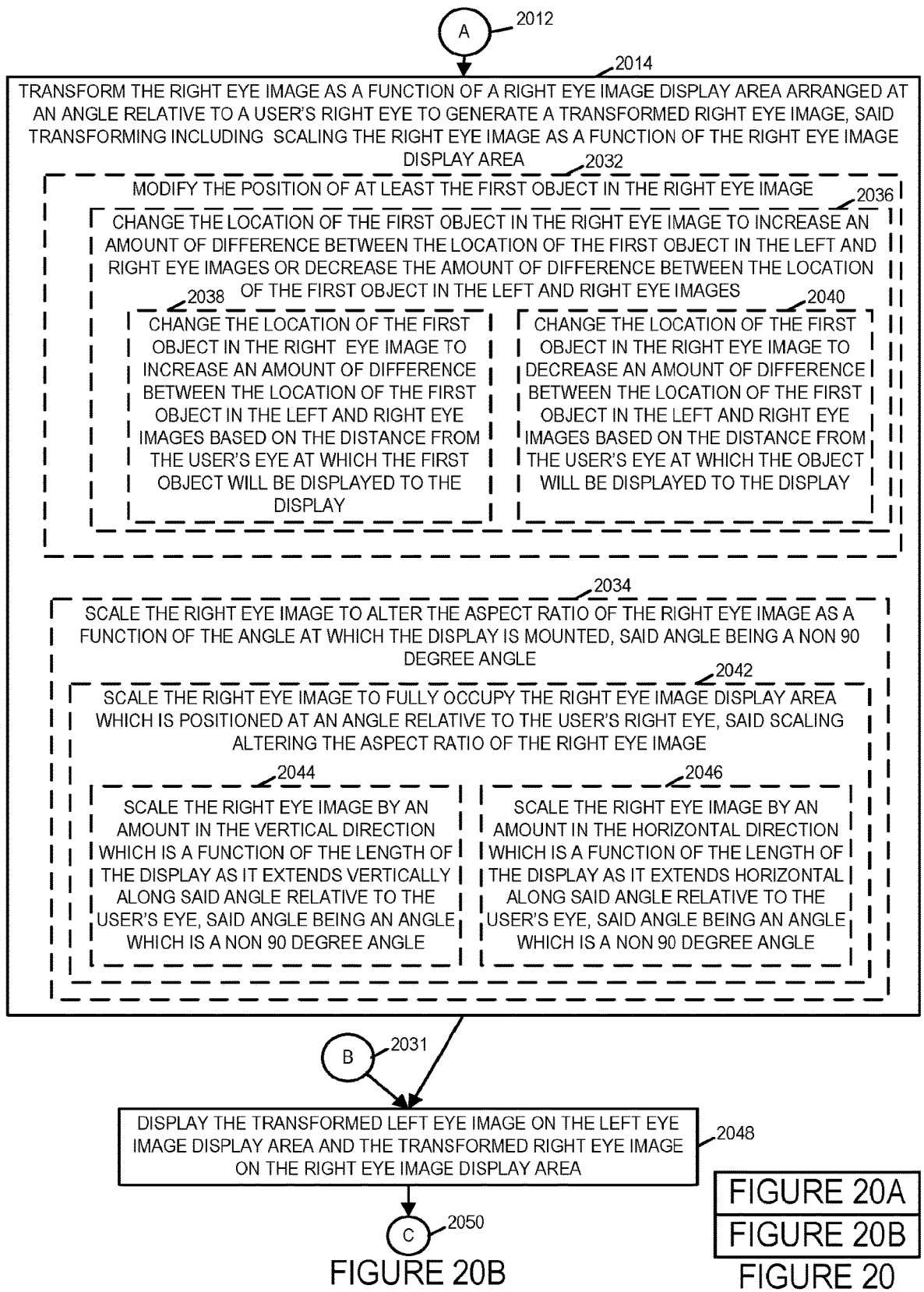
FIG. 20B is a second part of a flowchart of an exemplary method of processing and displaying images on one or more displays in accordance with an exemplary embodiment of the invention.
Figure 20A:
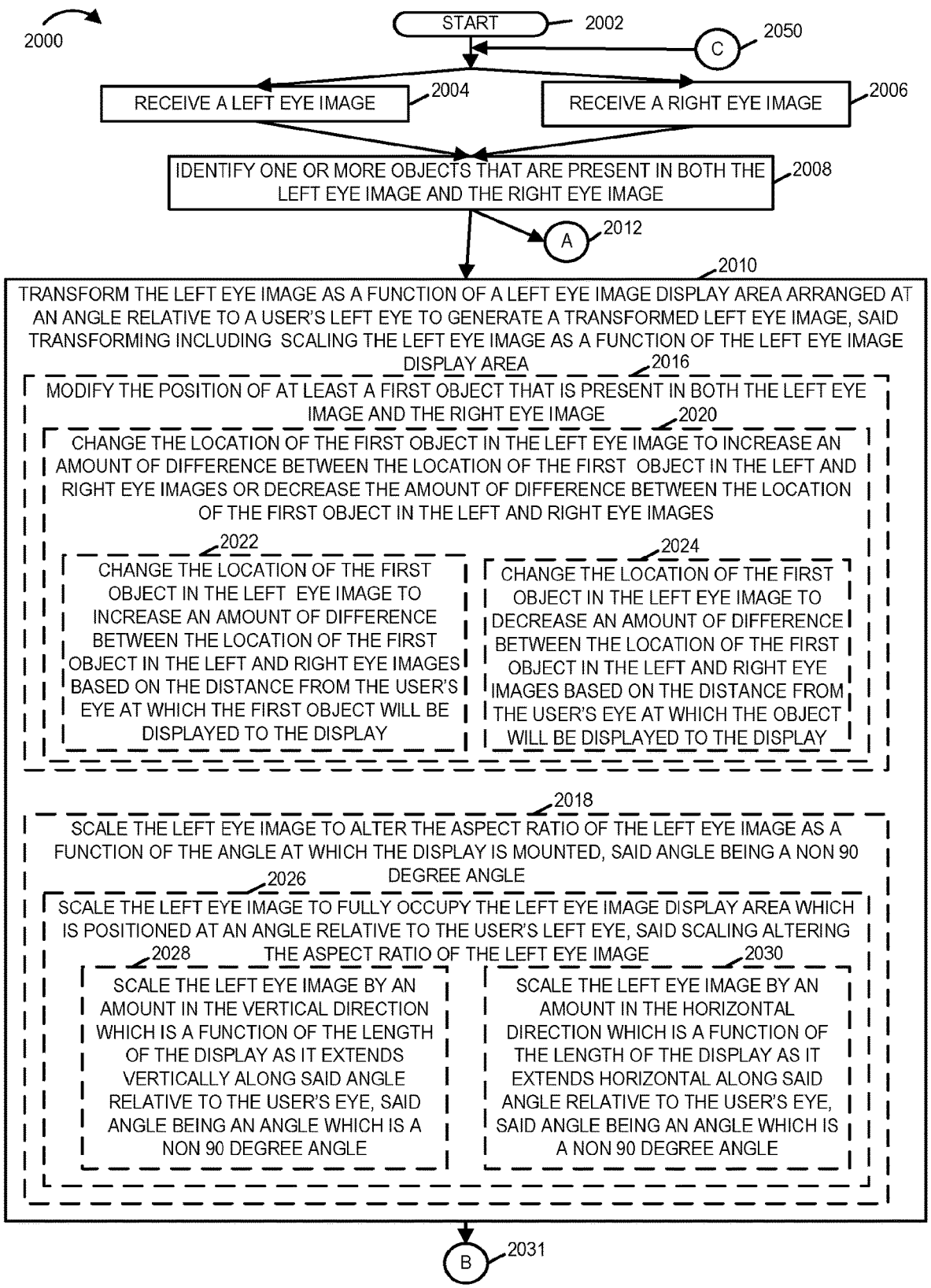
FIG. 20A is a first part of a flowchart of an exemplary method of processing and displaying images on one or more displays in accordance with an exemplary embodiment of the invention.

FIG. 20, comprising the combination of FIG. 20A and FIG. 20B, is a flowchart 2000 of an exemplary method of processing and displaying images on one or more displays in accordance with an exemplary embodiment. In some exemplary embodiments, the method of flowchart 2000 is performed by a system, e.g., a rendering and display system including a processor and one or more displays, e.g., one or more angle mounted, e.g., rotated or tilted, displays included as part of a head mounted display assembly, e.g., a stereoscopic head mounted display assembly. In some embodiments, the system implementing the method of flowchart 2000 includes a head mounted display assembly which is a device including one or more angle mounted displays, a receiver, a processor and/or circuits which perform steps of the exemplary method. In some embodiments, the system implementing the method of flowchart 2000 includes: i) a head mounted display assembly which is a device including one or more angle mounted displays and a receiver and ii) an image processing and rendering device including a receiver, an processor and/or circuits, which performs image processing including object identification and image transformation operations, and a transmitter, said head mounted display assembly device coupled to said image processing and rendering device, e.g., via a wired or wireless communications channel.

In some exemplary embodiments, the method of flowchart 2000 is performed by rendering and playback system 1200, e.g., a device, of FIG. 12 including processor 1208 and display 1202 and/or display 1203. Operation starts in step 2002 in which the system is powered on and initialized. Operation proceeds from step 2002 to step 2004 and step 2006. In step 2002 the system receives a left eye image, and in step 2006 the system receives a right eye image. Operation proceeds from step 2004 and step 2006 to step 2008. In step 2008 the system identifies one or more objects that are present in both the left eye image and the right eye image. Operation proceeds from step 2008 to step 2010 and, via connecting node A 2012, to step 2014.

In step 2010 the system transforms the left eye image as a function of a left eye image display area arranged at an angle relative to a user's left eye to generate a transformed left eye image, said transforming including scaling the left eye image as a function of the left eye image display area. In some embodiments, the angle is greater than 0 degrees and less than 45 degrees. In some embodiments, the magnitude of the angle, expressed in degrees, is greater than 0 and less than 45. In some embodiments, the angle is greater than 45 degrees and less than 90 degrees. In some embodiments, the magnitude of the angle, expressed in degrees, is greater than 45 and less than 90. In some embodiments, the angle is greater than 90 degrees and less than 135 degrees. In some embodiments, the magnitude of the angle, expressed in degrees, is greater than 90 and less than 135.

In various embodiments, step 2016 includes one or both of steps 2016 and 2018. In step 2016 the system modifies the position of at least a first object that is present in both the left eye image and the right eye image. In some such embodiments, step 2016 includes step 2020. In step 2020 the system changes the location of the first object in the left eye image to increase an amount of difference between the location of the first object in the left and right eye images or decrease the amount of difference between the location of the first object in the left and right eye images. In some such embodiments, step 2020 includes step 2022 or step 2024. In step 2022 the system changes the location of the first object in the left eye image to increase an amount of difference between the location of the first object in the left and right eye images based on the distance from the user's eye at which the first object will be displayed to the display. For example, if the first object is on a portion of the screen closer to the viewer, e.g., due to the tilt or rotation of the display mounting, the difference in location is adjusted to increase the distance and thereby make the first object appear further away than if no adjustment was made. In step 2024 the system changes the location of the first object in the left eye image to decrease an amount of difference between the location of the first object in the left and right eye images based on the distance from the user's eye at which the first object will be displayed to the display. For example, if the first object is on a portion of the screen further away from the viewer, e.g., due to the tilt or rotation of the display mounting, the difference in location is adjusted to decrease the distance and thereby make the first object appear closer than if no object position adjustment was made.

In step 2018 the system scales the left eye image to alter the aspect ratio of the left eye image as a function of the angle at which the display is mounted, said angle being a non 90 degree angle.

In some embodiments, step 2018 includes step 2026. In step 2026 the system scales the left eye image to fully occupy the left image display area which is positioned at an angle relative to the user's left eye, said scaling altering the aspect ratio of the left eye image area. In some embodiments, step 2026 includes steps 2028 or 2030.

In step 2028 the system scales the left eye image by an amount in the vertical direction which is a function of the length of the display, corresponding to the left eye, as it extends vertically along said angle relative to the user's eye, said angle being an angle which is a non 90 degree angle. For example, if the display screen is sloped in the vertical direction, e.g., with a tilt, the image will be scaled to be longer in the vertical direction than if the image was displayed on a vertically mounted screen at 90 degrees relative to the user's eyes. FIGS. 7, 13, 14, 15, and 16 illustrate examples of tilted left eye displays or tilted left eye display portions (713, left eyed display portion of 1313, left eye display portion of 1413, 1513, left eye display portion of 1613); FIG. 4 illustrates an untilted left eye display 413. FIG. 18 illustrates an exemplary display, e.g., display B 1802, intended to be mounted with tilt, e.g., for which scaling in accordance with step 2028 is performed.

In step 2030 the system scales the left eye image by an amount in the horizontal direction which is a function of the length of the display as it extends horizontal along said angle relative to the user's eye, said angle being an angle which is a non 90 degree angle. For example, if the display screen is sloped in the horizontal direction, e.g., with a rotation about the vertical axis, the image will be scaled to be longer in the horizontal direction than if the image was displayed on a vertically mounted unrotated screen at 90 degrees relative to the user's eyes. FIGS. 5 and 6 illustrate examples of rotated left eye displays 513, 613; and FIG. 4 illustrates an unrotated left eye display 413. FIG. 19 illustrates a display, e.g., display C 1902, intended to be mounted with rotation, e.g., for which scaling in accordance with step 2030 is to be performed.

In step 2014 the system transforms the right eye image as a function of a right eye image display area arranged at an angle relative to a user's right eye to generate a transformed right eye image, said transforming including scaling the right eye image as a function of the right eye image display area. In some embodiments, the angle is greater than 0 degrees and less than 45 degrees. In some embodiments, the magnitude of the angle, expressed in degrees, is greater than 0 and less than 45. In some embodiments, the angle is greater than 45 degrees and less than 90 degrees. In some embodiments, the magnitude of the angle, expressed in degrees, is greater than 45 and less than 90. In some embodiments, the angle is greater than 90 degrees and less than 135 degrees. In some embodiments, the magnitude of the angle, expressed in degrees, is greater than 90 and less than 135.

In some embodiments, the angle, e.g., of step 2010, relative to the user's left eye, is the same as the angle, e.g., of step 2014, relative to the user's right eye. In some embodiments, the angle relative to the user's left eye is the negative of the angle relative to the user's right eye.

In various embodiments, step 2014 includes one or both of steps 2032 and 2034. In step 2032 the system modifies the position of at least the first object in the right eye image. In some embodiments, step 2032 includes step 2036. In step 2036 the system changes the location of the first object in the right eye image to increase an amount of difference between the location of the first object in the left and right eye images or decrease the amount of difference between the location of the first object in the left and right eye images. In some embodiments, step 2036 includes step 2038 or step 2030. In step 2038 the system changes the location of the first object in the right eye image to increase an amount of difference between the location of the first object in the left and right eye images based on the distance from the user's eye at which the first object will be displayed to the display. For example, if the first object is on a portion of the screen closer to the viewer, e.g., due to the tilt or rotation of the display mounting, the difference in location is adjusted to increase the distance and thereby make the first object appear further away than if no adjustment was made. In step 2030 the system changes the location of the first object in the right eye image to decrease an amount of difference between the location of the first object in the left and right eye images based on the distance from the user's eye at which the first object will be displayed to the display. For example, if the first object is on a portion of the screen further away from the viewer, e.g., due to the tilt or rotation of the display mounting, the difference in location is adjusted to decrease the distance and thereby make the first object appear closer than if no object position adjustment was made.

In step 2034 the system scales the right eye image to alter the aspect ratio of the right eye image as a function of the angle at which the display is mounted, said angle being a non 90 degree angle. In some embodiments, step 2034 includes step 2042. In step 2042 the system scales the right eye image to fully occupy the right image display area which is positioned at an angle relative to the user's right eye, said scaling altering the aspect ratio of the right eye image area. In some embodiments, step 2042 includes steps 2044 or 2046.

In step 2044 the system scales the right eye image by an amount in the vertical direction which is a function of the length of the display as it extends vertically along said angle relative to the user's eye, said angle being an angle which is a non 90 degree angle. For example, if the display screen is sloped in the vertical direction, e.g., with a tilt, the image will be scaled to be longer in the vertical direction than if the image was displayed on a vertically mounted screen at 90 degrees relative to the user's eyes. FIGS. 7, 13, 14, 15, and 16 illustrate examples of tilted right eye displays or tilted right eye display portions (714, right eye display portion of 1313, right eye display portion of 1413, 1515, right eye display portion of 1613); FIG. 4 illustrates an untilted right eye display 415. FIG. 18 illustrates an exemplary display intended to be mounted with tilt. FIG. 18 illustrates a display for which scaling in accordance with step 2044 is performed.

In step 2046 the system scales the right eye image by an amount in the horizontal direction which is a function of the length of the display as it extends horizontal along said angle relative to the user's eye, said angle being an angle which is a non 90 degree angle. For example, if the display screen is sloped in the horizontal direction, e.g., with a rotation about the vertical axis, the image will be scaled to be longer in the horizontal direction than if the image was displayed on a vertically mounted unrotated screen at 90 degrees relative to the user's eyes. FIGS. 5 and 6 illustrate examples of rotated right eye displays 515, 615; and FIG. 4 illustrates an unrotated right eye display 415. FIG. 19 illustrates an exemplary display intended to be mounted with a rotation. FIG. 19 illustrates a display for which scaling in accordance with step 2046 is performed.

Operation proceeds from step 2010, via connecting node B 2031, and from step 2014, to step 2048. In step 2048 the system displays the transformed left eye image on the left eye image display area and displays the transformed right eye image on the right eye image display area.

In some embodiments, said left eye image display area corresponds to a left eye image display; said right eye image display area corresponds to a right eye image display, said left eye image display and said right eye image display being different physical components. For example, the embodiments of FIGS. 5, 6, 7 and 15 illustrate exemplary left eye displays (513, 613, 713, 1513), and exemplary right eye displays (515, 615, 715, 1515). In one embodiment displays 513 and 515 are each the size of display 1902. In one embodiment displays 613 and 615 are each the size of display 1902. In one embodiment displays 713 and 715 are each the size of display 1802. In one embodiment displays 1513 and 1515 are each the size of display 1802.

In some embodiments, said left eye image display area corresponds to a first portion of a display; and said right eye image display area corresponds to a second portion of said display, said first and second portions being non-overlapping. For example, in some embodiments, the display is display 1313 of FIG. 13 or display 1413 of FIG. 14 and different non-overlapping portions of the display are used to display the transformed left and right eye images. In one embodiment display 1313 is the size of display 1802. In one embodiment display 1413 is the size of display 1802. Operation proceeds from step 2048, via connecting node C 2050 to steps 2004 and 2006.

In some embodiments, the left eye image display area and the right eye image display area are inclined vertically, e.g., as shown in FIGS. 7, 13, 14, 15, and 16. In some embodiments, the left eye image display area and the right eye image display area are rotated, e.g., about a vertical axis, as shown in FIGS. 5 and 6, so that they are angled horizontally relative to a user's eye.

In various embodiments, in step 2008 the system identifies multiple objects that are present in both the received left eye image and the received right eye image; and in step 2016 the system modifies the positions of a first set of objects included in said identified multiple objects in the left eye image; and in step 2032 the system modifies the positions of the first set of objects in the right eye image. Some of the objects in the first set of objects may be moved to increase an amount of difference between the location of the object in the left and right eye images, while other ones of the objects in the first set of objects may be moved to decrease an amount of difference between the location of the object in the left and right eye images. In some embodiments, object movement direction and amount is determined as a function of the distance from a user's eye to the location on the tilted and/or rotated display screen on which the object is mapped to appear.

In some embodiments the method of flowchart 2000 is implemented by any of: system 122 of FIG. 1, system 124 of FIG. 1, system 200 of FIG. 2 including display and processing capability, system 200 of FIG. 2 including display and processing capabilities, system 300 of FIG. 3, system 200" of FIG. 5 including display and processing capabilities, system 200''' of FIG. 6 including display and processing capabilities, system 200'''' of FIG. 7 including display and processing capabilities, system 200''''' of FIG. 8 including display and processing capabilities, system 200'''''' of FIG. 9 including display and processing capabilities, the system of FIG. 13 including display and processing capabilities, the system of FIG. 14 including display and processing capabilities, the system of FIG. 15 including display and processing capabilities, the system of FIG. 16 including display and processing capabilities, system 200 of FIG. 2 including display capabilities and a rendering and playback device, system 200" of FIG. 5 including display capabilities and a rendering and playback device, system 200''' of FIG. 6 including display capabilities and a rendering and playback device, system 200'''' of FIG. 7 including display capabilities and a rendering and playback device, system 200''''' of FIG. 8 including display capabilities and a rendering and playback device, system 200'''''' of FIG. 9 including display capabilities and a rendering and playback device, the system of FIG. 13 including display capabilities and a rendering and playback device, the system of FIG. 14 including display capabilities and a rendering and playback device, the system of FIG. 15 display capabilities and a rendering device.

Figures 21, 21B:
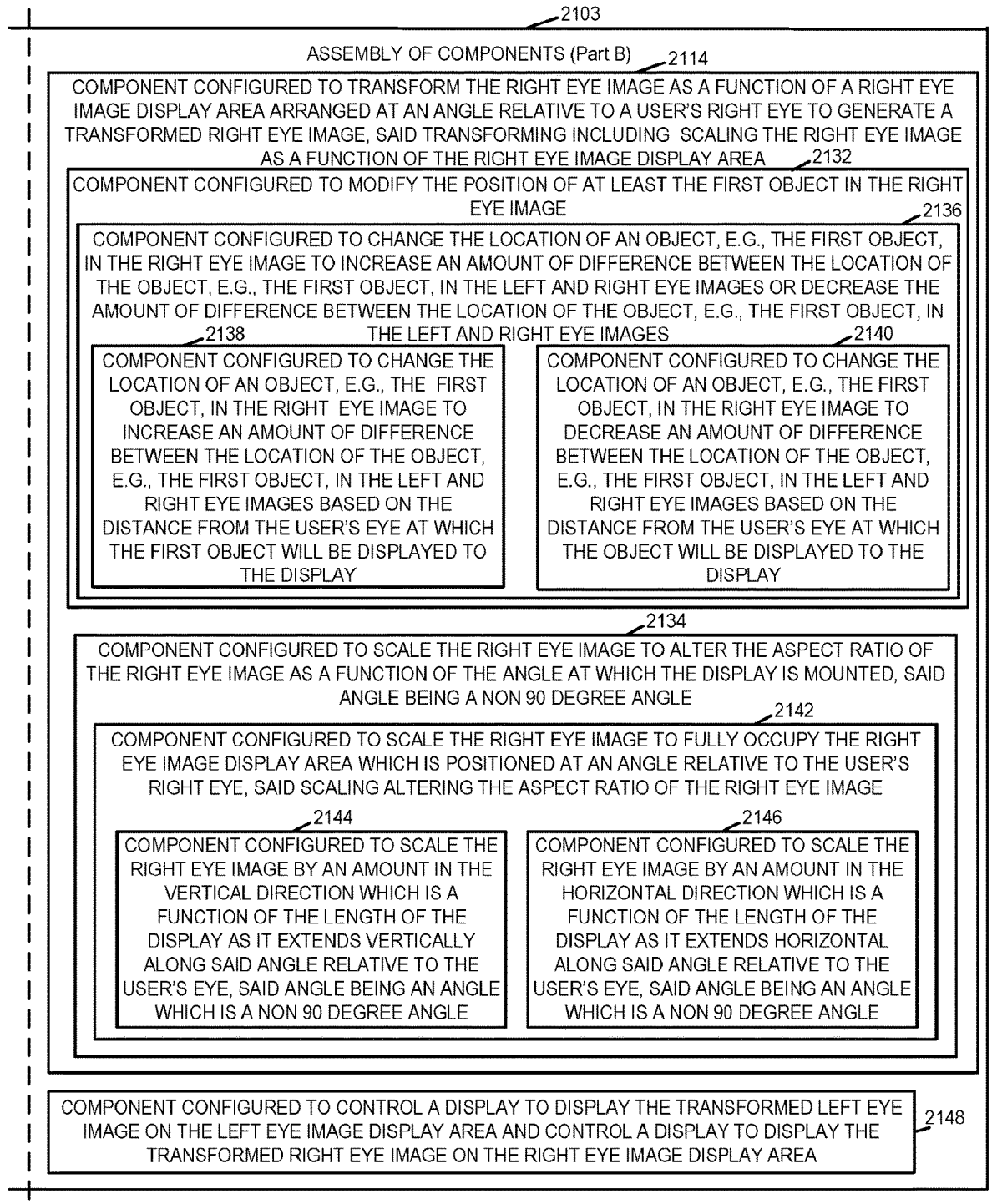
FIG. 21B is a second part of an assembly of components which may be included in an exemplary rendering and playback system in accordance with an exemplary embodiment of the invention.
FIG. 21 comprises the combination of FIG. 21A and FIG. 21B.
Figure 21A:
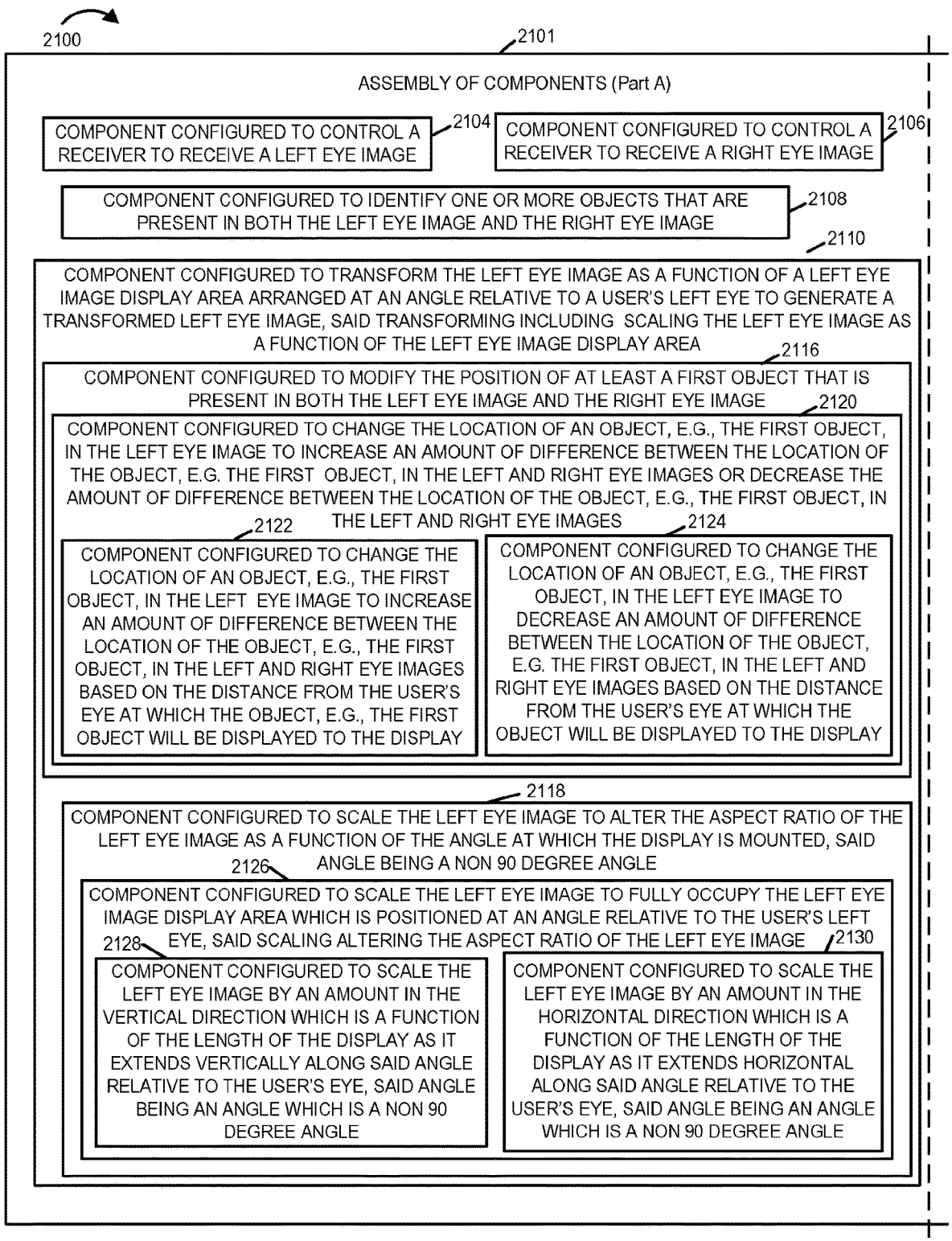
FIG. 21A is a first part of an assembly of components which may be included in an exemplary rendering and playback system in accordance with an exemplary embodiment of the invention.

FIG. 21, comprising the combination of FIG. 21A and FIG. 21B, is a drawing of an assembly of components 2100, comprising the combination of Part A 2101 and Part B 2103, in accordance with an exemplary embodiment. In one embodiment, exemplary assembly of components 2100 is assembly of components 1207 in system 1200. In one embodiment, exemplary assembly of components 2100 is assembly of components 1250 in memory 1212 of system 1200. In one embodiment, assembly of components 2100 is included in processor 1208. Exemplary assembly of components 2100 is included in an exemplary rendering and playback system, e.g., any of the exemplary rendering and playback systems shown and/or described in the Figures and/or corresponding text.

Assembly of components 2100 may be included in an exemplary rendering and playback system 1200. The components in the assembly of components 2100 can, and in some embodiments are, implemented fully in hardware within a processor, e.g., processor 1208, e.g., as individual circuits. The components in the assembly of components 2100 can, and in some embodiments are, implemented fully in hardware within the assembly of hardware components 1207, e.g., as individual circuits corresponding to the different components. In other embodiments some of the components are implemented, e.g., as circuits, within processor 1208 with other components being implemented, e.g., as circuits within assembly of components 1207, external to and coupled to the processor 1208. As should be appreciated the level of integration of components on the processor and/or with some components being external to the processor may be one of design choice. Alternatively, rather than being implemented as circuits, all or some of the components may be implemented in software and stored in the memory 1212 of the system 1200, with the components controlling operation of system 1200 to implement the functions corresponding to the components when the components are executed by a processor e.g., processor 1208. In some such embodiments, the assembly of components 2100 is included in the memory 1212 as assembly of software components 1250. In still other embodiments, various components in assembly of components 2100 are implemented as a combination of hardware and software, e.g., with another circuit external to the processor providing input to the processor which then under software control operates to perform a portion of a component's function.

When implemented in software the components include code, which when executed by a processor, e.g., processor 1208, configure the processor to implement the function corresponding to the component. In embodiments where the assembly of components 2100 is stored in the memory 1212, the memory 1212 is a computer program product comprising a computer readable medium comprising code, e.g., individual code for each component, for causing at least one computer, e.g., processor 1208, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 21 control and/or configure the system 1200 or elements therein such as the processor 1208, to perform the functions of corresponding steps illustrated and/or described in the method of one or more of the flowchart 2000 and/or described with respect to any of the Figures. Thus the assembly of components 2100 includes various components that perform functions of corresponding one or more described and/or illustrated steps of an exemplary method, e.g., one or more steps of the method of FIG. 20.

Assembly of components 2100 includes a component 2104 configured to control a receiver to receive a left eye image, a component 2106 configured to control a receiver to receive a right eye image, a component 2108 configured to identify one or more objects that are present in both the left and right eye images, a component 2110 configured to transform the left eye image as a function of a left eye image display array arranged at an angle relative to a user's left eye, to generate a transformed left eye image, said transforming including scaling the left eye image as a function of the left eye image display area, a component 2114 configured to transform the right eye image as a function of a right eye image display area arrange at an angle relative to a user's right eye to generate a transformed right eye image, said transforming include scaling the right eye image as a function of the right eye image display area, and a component 2148 configured to control a display to display the transformed left eye image on the left eye image display area and control a display to display the transformed right eye image on the right eye image display area.

Component 2110 includes a component 2116 configured to modify the position of at least a first object that is present in both the left eye image and the right eye image and a component 2118 configured to scale the left eye image to alter the aspect ratio of the left eye image as a function of the angle at which the display is mounted, said angle being a non 90 degree angle. Component 2116 includes a component 2120 configured to change the location of an object, e.g., the first object, in the left eye image to increase an amount of difference between the location of the object, e.g., the first object, in the left and right eye images or decrease the amount of difference between the location of the object, e.g. the first object, in the left and right eye images. Component 2120 includes a component 2122 configured to change the location of an object, e.g., the first object, in the left eye image to increase an amount of difference between the location of the object, e.g., the first object, in the left and right eye images based on the distance from the user's eye at which the object, e.g., the first object, will be displayed on the display and a component 2124 configured to change the location of an object, e.g., the first object, in the left eye image to decrease an amount of difference between the location of the object, e.g., the first object, in the left and right eye images based on the distance from the user's eye at which the object, e.g., the first object, will be displayed on the display.

Component 2118 includes a component 2126 configured to scale the left eye image to fully occupy the left eye image display area which is positioned at an angle relative to the user's left eye, said scaling altering the aspect ratio of the left eye image. Component 2126 includes a component 2128 configured to scale the left eye image by an amount in the vertical direction which is a function of the length of the display as it extends vertically along said angle relative to the user's eye, said angle being an angle which is a non 90 degree angle, and a component 2130 configured to scale the left eye image by an amount in the horizontal direction which is a function of the length of the display as it extends horizontal along said angle relative to the user's eye, said angle being a non 90 degree angle.

Component 2114 includes a component 2132 configured to modify the position of at least a first object in the right eye image and a component 2134 configured to scale the right eye image to alter the aspect ratio of the right eye image as a function of the angle at which the display is mounted, said angle being a non 90 degree angle. Component 2132 includes a component 2136 configured to change the location of an object, e.g., the first object, in the right eye image to increase an amount of difference between the location of the object, e.g., the first object, in the left and right eye images or decrease the amount of difference between the location of the object, e.g. the first object, in the left and right eye images. Component 2136 includes a component 2138 configured to change the location of an object, e.g., the first object, in the right eye image to increase an amount of difference between the location of the object, e.g., the first object, in the left and right eye images based on the distance from the user's eye at which the object, e.g., the first object, will be displayed on the display and a component 2140 configured to change the location of an object, e.g., the first object, in the right eye image to decrease an amount of difference between the location of the object, e.g., the first object, in the left and right eye images based on the distance from the user's eye at which the object, e.g., the first object, will be displayed on the display.

Component 2134 includes a component 2142 configured to scale the right eye image to fully occupy the right eye image display area which is positioned at an angle relative to the user's right eye, said scaling altering the aspect ratio of the right eye image. Component 2142 includes a component 2144 configured to scale the right eye image by an amount in the vertical direction which is a function of the length of the display as it extends vertically along said angle relative to the user's eye, said angle being an angle which is a non 90 degree angle, and a component 2146 configured to scale the right eye image by an amount in the horizontal direction which is a function of the length of the display as it extends horizontal along said angle relative to the user's eye, said angle being a non 90 degree angle.

Figure 22:
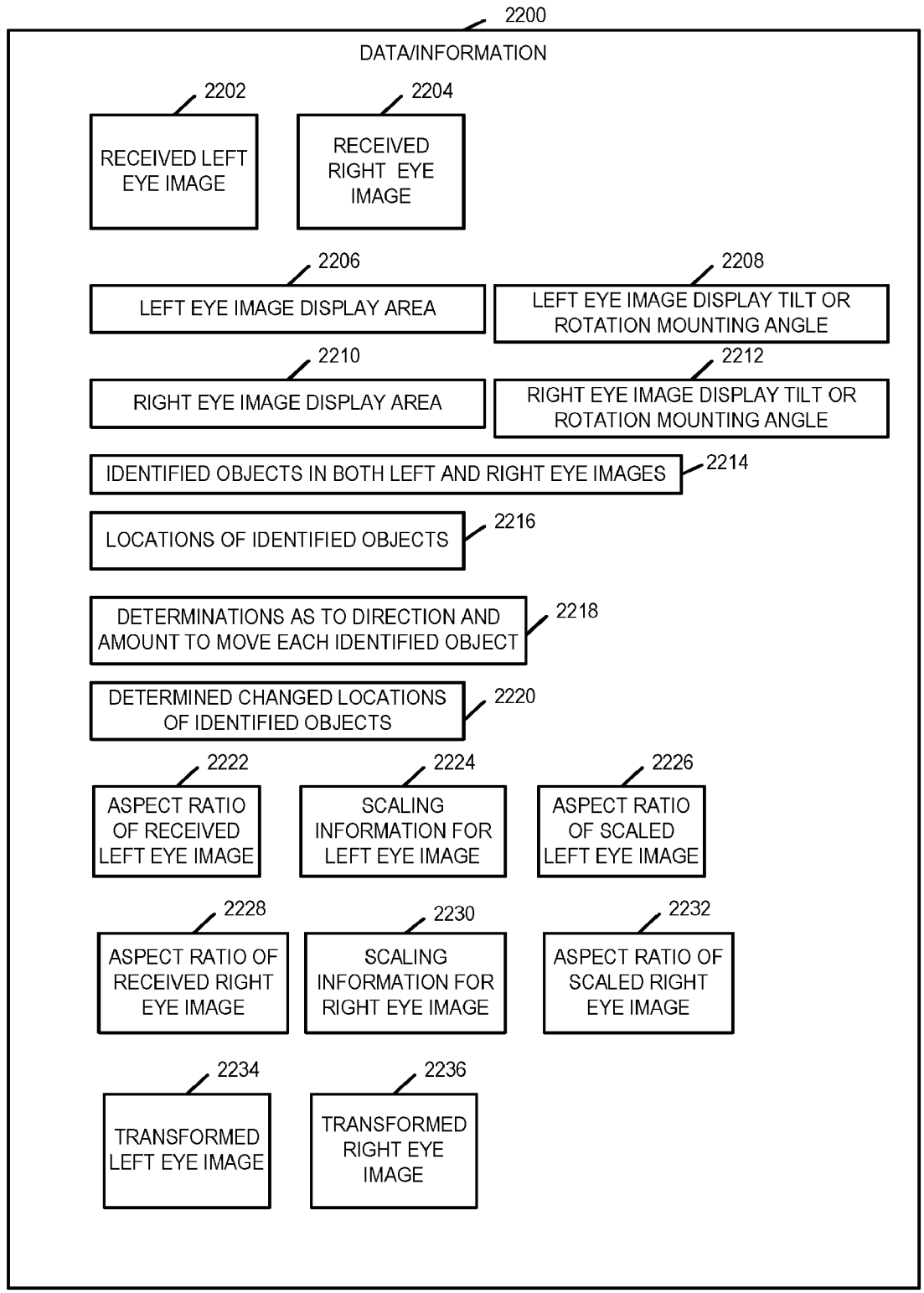
FIG. 22 is a drawing of exemplary data/information which may be included in an exemplary rendering and playback system in accordance with an exemplary embodiment of the invention.

FIG. 22 is a drawing of exemplary data/information 2200 in accordance with an exemplary embodiment. Exemplary data/information 2200 is, e.g., data/information 1252 of FIG. 12. Data/information 2200 includes a received left eye image 2202, a received right eye image 2204, a left eye image display area 2206, a left eye image display tilt or rotation mounting angle 2208, a right eye image display area 2210, a right eye image display tilt or rotation mounting angle 2212, identified objects in both left and right eye images 2214, locations of identified objects 2216, determinations as to direction and amount to move each identified object 2218, and determined changed location of identified objects 2220. Data/information 2200 further includes an aspect ratio of a received left eye image 2222, scaling information for the left eye image 2224, an aspect ratio of the scaled left eye image 2226, an aspect ratio of the received right eye image 2228, scaling information for the right eye image 2230, an aspect ratio of the scaled right eye image 2232, a transformed left eye image 2234, and a transformed right eye image 2236.

Several lists of exemplary numbered embodiments are included below. The embodiment numbering within a list pertains to that particular list.

First List of Exemplary Numbered System Embodiments

System Embodiment 1 A system (200, 200", 200'", or 200""), the system comprising: a headmount assembly (202, 502, 602 or 702); and a first display (213, 513, 613 or 713) included in the headmount assembly (202, 502, 602 or 702) and mounted at an angle relative of a user's eye position.

System Embodiment 2 The system (200, 200", 200'", or 200"") of System Embodiment 1, wherein the first display (213, 513, 613 or 713) is a left eye display; and wherein the system (200, 200", 200'", or 200"") further comprises: a second display (215, 515, 615 or 715) included in the headmount assembly (202, 502, 602 or 702) and mounted at an angle relative of a user's right eye position.

System Embodiment 3 The system (200, 200", 200'", or 200"") of System Embodiment 2, further comprising: a first lens (210, 510, 610 or 710) positioned between the first display (213, 513, 613 or 713) and the user's left eye position.

System Embodiment 4 The system (200, 200", 200'", or 200"") of claim 3, further comprising: a second lens (212, 512, 612 or 712) positioned between the second display (215, 515, 615 or 715) and the user's right eye position.

System Embodiment 5 The system (200, 200", 200'", or 200"") of System Embodiment 4, wherein the headmount assembly (202, 502, 602 or 702) includes a display housing (203, 503, 603 or 703); and wherein the first and second displays ((213, 215), (513, 515), (613, 615), or (713, 715)) are mounted in said display housing (203, 503, 603 or 703).

System Embodiment 6 The system (200, 200", 200'", or 200"") of claim 5, wherein the headmount assembly (202, 502, 602 or 702) further includes a strap (208, 508, 608 or 708) for securing the display housing (203, 503, 603, or 703) to a user's head.

System Embodiment 7 The system (200, 200", 200'", or 200"") of claim 1, wherein the angle is a non 90 degree angle relative to a bottom (256) or side ((250 or 252), (550 or 552), (650 or 652) of the display housing (203, 503, 603 or 703).

System Embodiment 8 A system (1602), the system comprising: a display housing (1603); and a first display (1613) mounted in said display housing (1603) at an angle relative to a viewing surface (1610) through which the first display (1613) can be viewed.

System Embodiment 9 The system (1602) of System Embodiment 8, wherein said viewing surface (1610) is a glass or plastic surface through which the first display (1613) can be viewed.

System Embodiment 10 The system (1602) of System Embodiment 8, wherein the display housing (1603) is part of an automated teller machine (ATM) or vehicle dashboard (1601).

List of Set of Exemplary Numbered Method Embodiments

Method Embodiment 1 A method of processing and displaying images on one or more displays, the method comprising: receiving a left eye image; receiving a right eye image; transforming the left eye image as a function of a left eye image display area arranged at an angle relative to a user's left eye to generate a transformed left eye image, said transforming including scaling the left eye image as a function of the left eye image display area; transforming the right eye image as a function of a right eye image display area arranged at an angle relative to the user's right eye to generate a transformed right eye image, said transforming the right eye image including scaling the right eye image as a function of a right eye image display area; and displaying the transformed left eye image on the left eye image display area and displaying the transformed right eye image on the right eye image display area.

Method Embodiment 2 The method of Method Embodiment 1, wherein said angle is greater than 0 and less than 45 degrees.

Method Embodiment 3 The method of Method Embodiment 1, wherein said scaling of the left eye image alters the aspect ratio of the left eye image as a function of the angle at which the display is mounted, said angle being a non 90 degree angle.

Method Embodiment 4 The method of Method Embodiment 1, wherein the left eye image display area is inclined vertically; wherein said received left eye image has a first aspect ratio (height to width ratio); and wherein said scaling the left eye image includes scaling the left eye image to fully occupy the left eye image display area which is positioned at an angle relative to the user's left eye, said scaling altering the aspect ratio of the left eye image.

Method Embodiment 5 The method of Method Embodiment 4, wherein scaling the left eye image is by an amount in the vertical direction which is a function of the length of the display as it extends vertically along said angle relative to the user's eye, said angle being an angle which is a non 90 degree angle.

Method Embodiment 6 The method of Method Embodiment 3, wherein the left eye display area is angled horizontally relative to the user's left eye; and wherein scaling the left eye image is by an amount in the horizontal direction which is a function of the length of the display as it extends horizontally along said angle relative to the user's left eye, said angle being an angle which is a non 90 degree angle.

Method Embodiment 7 The method of Method Embodiment 3, further comprising: identifying one or more objects that are present in both the left eye image and right eye image; and wherein transforming the left eye image further includes modifying the position of at least a first object that is present in both the left eye image and right eye image in the left eye image; and wherein transforming the right eye image further includes modifying the position of at least said first object in the right eye image.

Method Embodiment 8 The method of Method Embodiment 7, wherein modifying the position of the first object in the left eye image includes changing the location of the first object in said left eye image to increase an amount of difference between the locations of the first object in the left and right eye images or decrease the amount of difference between the locations of the first object in the left and right eye images; and wherein modifying the position of the first object in the right eye image includes changing the location of the first object in said right eye image to increase an amount of difference between the locations of the first object in the left and right eye images or decrease the amount of difference between the locations of the first object in the left and right eye images.

Method Embodiment 9 The method of Method Embodiment 8, wherein modifying the position of the first object in the left eye image includes changing the location of the first object in the left image to increase the difference based on the distance from the user's eye at which the first object will be displayed on the display; and wherein modifying the position of the first object in the right eye image includes changing the location of the first object in the right image to increase the difference based on the distance from the user's eye at which the first object will be displayed on the display.

Method Embodiment 10 The method of Method Embodiment 8, wherein modifying the position of the first object in the left eye image includes changing the location of the first object in the left image to decrease the difference based on the distance from the user's eye at which the first object will be displayed on the display; and wherein modifying the position of the first object in the right eye image includes changing the location of the first object in the right image to decrease the difference based on the distance from the user's eye at which the first object will be displayed on the display.

Method Embodiment 11 The method of Method Embodiment 1, wherein said left eye image display area corresponds to a left eye image display; and wherein said right eye image display area corresponds to a right eye image display, said left eye image display and said right eye image display being different physical components.

Method Embodiment 12 The method of Method Embodiment 1, wherein said left eye image display is the same size as said right eye image display.

Method Embodiment 13 The method of Method Embodiment 1, wherein said left eye image display area corresponds to a first portion of a display; and wherein said right eye image display area corresponds to a second portion of said display, said first and second portions being non-overlapping.

Second List of Set of Exemplary Numbered System Embodiments

System Embodiment 1 A system for processing and displaying images on one or more displays, the system comprising: a processor (1208) configured to: receive a left eye image; receive a right eye image; transform the left eye image as a function of a left eye image display area arranged at an angle relative to a user's left eye to generate a transformed left eye image, said transforming including scaling the left eye image as a function of the left eye image display area; transform the right eye image as a function of a right eye image display area arranged at an angle relative to the user's right eye to generate a transformed right eye image, said transforming the right eye image including scaling the right eye image as a function of a right eye image display area; and display the transformed left eye image on the left eye image display area and display the transformed right eye image on the right eye image display area.

System Embodiment 2 The system of System Embodiment 1, wherein said angle is greater than 0 and less than 45 degrees.

System Embodiment 3 The system of System Embodiment 1, wherein said scaling of the left eye image alters the aspect ratio of the left eye image as a function of the angle at which the display is mounted, said angle being a non 90 degree angle.

System Embodiment 4 The system of System Embodiment 1, wherein the left eye image display area is inclined vertically; wherein said received left eye image has a first aspect ratio (height to width ratio); and wherein said scaling the left eye image includes scaling the left eye image to fully occupy the left eye image display area which is positioned at an angle relative to the user's left eye, said scaling altering the aspect ratio of the left eye image.

System Embodiment 5 The system of System Embodiment 4, wherein scaling the left eye image is by an amount in the vertical direction which is a function of the length of the display as it extends vertically along said angle relative to the user's eye, said angle being an angle which is a non 90 degree angle.

System Embodiment 6 The system of System Embodiment 3, wherein the left eye display area is angled horizontally relative to the user's left eye; and wherein scaling the left eye image is by an amount in the horizontal direction which is a function of the length of the display as it extends horizontally along said angle relative to the user's left eye, said angle being an angle which is a non 90 degree angle.

System Embodiment 7 The system of System Embodiment 3, further comprising: identifying one or more objects that are present in both the left eye image and right eye image; and wherein transforming the left eye image further includes modifying the position of at least a first object that is present in both the left eye image and right eye image in the left eye image; and wherein transforming the right eye image further includes modifying the position of at least said first object in the right eye image.

System Embodiment 8 The system of System Embodiment 7, wherein modifying the position of the first object in the left eye image includes changing the location of the first object in said left eye image to increase an amount of difference between the locations of the first object in the left and right eye images or decrease the amount of difference between the locations of the first object in the left and right eye images; and wherein modifying the position of the first object in the right eye image includes changing the location of the first object in said right eye image to increase an amount of difference between the locations of the first object in the left and right eye images or decrease the amount of difference between the locations of the first object in the left and right eye images.

System Embodiment 9 The system of System Embodiment 8, wherein modifying the position of the first object in the left eye image includes changing the location of the first object in the left image to increase the difference based on the distance from the user's eye at which the first object will be displayed on the display; and wherein modifying the position of the first object in the right eye image includes changing the location of the first object in the right image to increase the difference based on the distance from the user's eye at which the first object will be displayed on the display.

System Embodiment 10 The system of System Embodiment 8, wherein modifying the position of the first object in the left eye image includes changing the location of the first object in the left image to decrease the difference based on the distance from the user's eye at which the first object will be displayed on the display; and wherein modifying the position of the first object in the right eye image includes changing the location of the first object in the right image to decrease the difference based on the distance from the user's eye at which the first object will be displayed on the display.

System Embodiment 11 The system of System Embodiment 1, further comprising: a left eye image display; and a right eye image display; wherein said left eye image display area corresponds to the left eye image display; and wherein said right eye image display area corresponds to the right eye image display.

System Embodiment 12 The system of System Embodiment 1, further comprising: a display; wherein said left eye image display area corresponds to a first portion of said display; and wherein said right eye image display area corresponds to a second portion of display, said first and second portions being non-overlapping.

List of Set of Exemplary Numbered Computer Readable Medium Embodiments

Computer Readable Medium Embodiment 1 A non-transitory computer readable medium including computer executable instructions which when executed by one or more processors of a rendering and playback system cause the rendering and playback system to perform the steps of: receiving a left eye image; receiving a right eye image; transforming the left eye image as a function of a left eye image display area arranged at an angle relative to a user's left eye to generate a transformed left eye image, said transforming including scaling the left eye image as a function of the left eye image display area; transforming the right eye image as a function of a right eye image display area arranged at an angle relative to the user's right eye to generate a transformed right eye image, said transforming the right eye image including scaling the right eye image as a function of a right eye image display area; and displaying the transformed left eye image on the left eye image display area and displaying the transformed right eye image on the right eye image display area.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using components. Such components may, and in some embodiments are, implemented as software modules. In other embodiments the components are implemented in hardware. In still other embodiments the components are implemented using a combination of software and hardware. In some embodiments the components are implemented as individual circuits with each component being implemented as a circuit for performing the function to which the component corresponds. A wide variety of embodiments are contemplated including some embodiments where different components are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A system, comprising:
a headmount assembly configured to fasten the system to a head of a user; and
a housing affixed to the headmount assembly and configured to:
secure a first panel of a display device for a first eye of the user, and
secure a second panel of the display device for the first eye of the user,
wherein the first panel is tilted at an angle relative to the second panel.

2. The system of claim 1, wherein the angle comprises at least one of a non 90 degree angle relative to a vertical reference of the system and a non 90 degree angle relative to a horizontal reference of the system.

3. The system of claim 1, wherein the display device is a left-eye display device, and wherein the housing is further configured to:
secure the left-eye display device at a first angle relative to a left-eye position of the user; and
secure a right-eye display device at a second angle relative to a right-eye position of the user.

4. The system of claim 3, further comprising the left-eye display device and the right-eye display device, wherein:
the left-eye display device comprises the first panel arranged adjacent to the second panel;
the first panel is tilted at a third angle relative to at least one of a horizontal reference and a vertical reference of the system; and
the second panel is tilted at a fourth angle relative to at least one of the horizontal reference and the vertical reference of the system.

5. The system of claim 4, wherein:
the right-eye display device comprises a third panel arranged adjacent to a fourth panel;

the third panel is tilted at a fifth angle relative to at least one of the horizontal reference and the vertical reference of the system; and the fourth panel is tilted at a sixth angle relative to at least one of the horizontal reference and the vertical reference of the system.

6. The system of claim 3, further comprising at least one of:

a left-eye lens affixed to the headmount assembly and arranged between the left-eye display device and the left-eye position of the user; and a right-eye lens affixed to the headmount assembly and arranged between the right-eye display device and the right-eye position of the user.

7. The system of claim 1, wherein the headmount assembly further comprises a strap.

8. The system of claim 1, further comprising:

the display device;

at least one non-transitory computer readable medium comprising computer instructions; and at least one processor configured to execute the computer instructions to:

obtain a left-eye image and a right-eye image;

transform the left-eye image based on a characteristic of a left-eye display area of the display device to generate a transformed left-eye image, wherein:

the left-eye display area is configured to face the user at a first angle relative to a left eye of the user and comprises the left-eye display characteristic, the instructions to transform the left-eye image comprise instructions to scale the left-eye image by a first scaling factor in a horizontal direction and by a second scaling factor in a vertical direction, and the first and second scaling factors are based on the left-eye display characteristic;

transform the right-eye image based on a characteristic of a right-eye display area of the display device to generate a transformed right-eye image, wherein:

the right-eye display area is configured to face the user at a second angle relative to a right eye of the user and comprises the right-eye display characteristic, the instructions to transform the right-eye image comprise instructions to scale the right-eye image by a third scaling factor in a horizontal direction and by a fourth scaling factor in a vertical direction, and the third and fourth scaling factors are based on the right-eye display characteristic; and cause the transformed left-eye image to be displayed on the left-eye display area and the transformed right-eye image to be displayed on the right-eye display area.

9. The system of claim 8, wherein the left-eye display area is inclined vertically relative to the left eye of the user, and wherein the second scaling factor is configured to scale the left-eye image to fully occupy a vertical height of the left-eye display area.

10. The system of claim 9, wherein the second scaling factor is based on a length of the left-eye display area as it extends vertically along the first angle.

11. The system of claim 8, wherein the left-eye display area is angled horizontally relative to the left eye of the user, and wherein the first scaling factor is configured to scale the left-eye image to fully occupy a horizontal width of the left-eye display area.

12. The system of claim 11, wherein the first scaling factor is based on a width of the left-eye display area as it extends horizontally along the first angle.

\* \* \* \* \*